: US 10,225,092 B2
(45) Date of Patent: *Mar. 5, 2019

(54) TRANSMISSION CONTROL SYSTEM, TRANSMISSION SYSTEM, RELAY DEVICE SELECTING METHOD, COMPUTER PROGRAM PRODUCT, AND MAINTENANCE SYSTEM FOR SELECTING A PRIORITIZED RELAY DEVICE FOR COMMUNICATION BETWEEN TERMINALS

(71) Applicant: Ricoh Company, Ltd., Tokyo (JP)

(72) Inventors: Hiroyuki Kanda, Kanagawa (JP); Takahiro Asai, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 54 days.

This patent is subject to a terminal disclaimer.

(21) Appl. No.: 15/354,466

(22) Filed: Nov. 17, 2016

(65) Prior Publication Data

US 2017/0070359 A1 Mar. 9, 2017

Related U.S. Application Data

(63) Continuation of application No. PCT/JP2015/066127, filed on May 28, 2015.

(30) Foreign Application Priority Data

May 28, 2014 (JP) .................. 2014-109772
Apr. 20, 2015 (JP) .................. 2015-085865

(51) Int. Cl.
*H04L 12/18* (2006.01)
*H04N 7/15* (2006.01)
(Continued)

(52) U.S. Cl.
CPC ...... *H04L 12/1822* (2013.01); *H04L 12/1827* (2013.01); *H04L 12/1881* (2013.01);
(Continued)

(58) Field of Classification Search
CPC ............. H04L 12/1822; H04L 12/1827; H04L 12/1881; H04L 12/1887; H04W 84/047;
(Continued)

(56) References Cited

U.S. PATENT DOCUMENTS

2008/0266383 A1 10/2008 Shah et al.
2010/0166064 A1 7/2010 Perlman et al.
(Continued)

FOREIGN PATENT DOCUMENTS

EP 2 140 609 A2 1/2010
JP 2008-227577 9/2008
(Continued)

OTHER PUBLICATIONS

Extended European Search Report dated May 2, 2017 in Patent Application No. 15799756.0.
(Continued)

*Primary Examiner* — Peter Chen
(74) *Attorney, Agent, or Firm* — Oblon, McClelland, Maier & Neustadt, L.L.P.

(57) ABSTRACT

A transmission control system includes: a storage unit that stores therein zone identification information for identifying a zone in which each of transmission terminals is used, and priority information that indicates a priority at which a transmission terminal indicated by the zone identification information should use each of a plurality of relay devices, in association with each other; a reception unit that receives, from a first transmission terminal, first zone identification information for identifying a zone in which the first transmission terminal is used and second zone identification (Continued)

information for identifying a zone in which a second transmission terminal as a destination terminal is used; and a selection unit that selects a relay device to be used for relaying the content data based on first priority information associated with the first zone identification information and second priority information associated with the second zone identification information in the storage unit.

10 Claims, 19 Drawing Sheets

(51) Int. Cl.
 H04N 7/14 (2006.01)
 H04N 21/262 (2011.01)
 H04M 3/56 (2006.01)
(52) U.S. Cl.
 CPC ............ *H04M 3/567* (2013.01); *H04N 7/147* (2013.01); *H04N 7/15* (2013.01); *H04N 21/26233* (2013.01)
(58) Field of Classification Search
 CPC ..... H04W 36/30; H04W 40/12; H04W 40/22; H04W 64/00; H04W 64/003; H04W 28/0226; H04W 4/02; H04M 3/567; H04M 2201/50; H04M 1/72572; H04N 7/15; H04N 7/147; H04B 7/14; H04B 7/15; H04B 7/2606
 See application file for complete search history.

(56) References Cited

U.S. PATENT DOCUMENTS

| | | |
|---|---|---|
| 2012/0002003 A1 | 1/2012 | Okita et al. |
| 2013/0242038 A1 | 9/2013 | Umehara et al. |
| 2013/0298031 A1 | 11/2013 | Kanda et al. |
| 2014/0055555 A1 | 2/2014 | Imai |
| 2014/0078245 A1 | 3/2014 | Umehara et al. |
| 2014/0240448 A1 | 8/2014 | Kanda et al. |
| 2014/0244755 A1 | 8/2014 | Kanda et al. |
| 2014/0244756 A1 | 8/2014 | Kanda et al. |
| 2014/0354767 A1 | 12/2014 | Imai |
| 2015/0009281 A1 | 1/2015 | Okita et al. |
| 2016/0007045 A1 | 1/2016 | Perlman et al. |

FOREIGN PATENT DOCUMENTS

| | | | |
|---|---|---|---|
| JP | 2011-066730 | 3/2011 | |
| JP | 2012-075072 | 4/2012 | |
| JP | 2014-072703 | 4/2014 | |
| WO | WO-2012074032 A1 * | 6/2012 | ......... H04L 12/1818 |
| WO | WO-2013069461 A1 * | 5/2013 | ......... H04L 63/0428 |

OTHER PUBLICATIONS

International Search Report dated Aug. 25, 2015 in PCT/JP2015/066127 filed May 28, 2015.
Written Opinion dated Aug. 25, 2015 in PCT/JP2015/066127 filed May 28, 2015.

* cited by examiner

CHANGE QUALITY CONTROL TABLE

| IP ADDRESS OF RELAY DESTINATION TERMINAL | IMAGE QUALITY OF IMAGE DATA TO BE RELAYED (IMAGE QUALITY) |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.10

|  |  | RELAY DEVICE ID | | | |
|---|---|---|---|---|---|
|  |  | 111a | 111b | 111c | 111d |
| INDICES | RUNNING COST | 0.8 | 0.7 | 1 | 0.9 |
|  | RELIABILITY | 1 | 0.9 | 0.9 | 0.9 |
|  | DEVICE SCALE | 0.9 | 0.8 | 1 | 0.6 |
| COEFFICIENT (AVERAGE) | | 0.9 | 0.8 | 0.97 | 0.8 |

FIG.11

RELAY DEVICE CONTROL TABLE

| RELAY DEVICE ID | OPERATING STATE | TIME AND DATE OF RECEPTION | RELAY DEVICE IP ADDRESS | MAXIMUM DATA TRANSMISSION RATE (Mbps) | CO-EFFICIENT |
|---|---|---|---|---|---|
| 111a | ONLINE | 2009.11.10.13:00 | 1.2.1.2 | 100 | 0.9 |
| 111b | OFFLINE | 2009.11.10.13:10 | 1.2.2.2 | 1000 | 0.8 |
| 111c | ONLINE | 2009.11.10.13:20 | 1.3.1.2 | 100 | 0.97 |
| 111d | ONLINE | 2009.11.10.13:30 | 1.3.2.2 | 10 | 0.8 |

FIG.12

TERMINAL AUTHENTICATION CONTROL TABLE

| TERMINAL ID | PASSWORD |
|---|---|
| 01aa | aaaa |
| 01ab | abab |
| 01ba | baba |
| ... | ... |

FIG.13

TERMINAL CONTROL TABLE

| TERMINAL ID | DESTINATION NAME | OPERATING STATE | TIME AND DATE OF RECEPTION | TERMINAL IP ADDRESS |
|---|---|---|---|---|
| 01aa | TERMINAL AA, TOKYO BUSINESS OFFICE, JAPAN | ONLINE (CALL ENABLED) | 2014.4.10.13:40 | 1.2.1.3 |
| 01ab | TERMINAL AB, OSAKA BUSINESS OFFICE, JAPAN | OFFLINE | 2014.4.09.12:00 | 1.2.1.4 |
| ... | ... | ... | ... | ... |
| 01ba | TERMINAL BA, BEIJING BUSINESS OFFICE, CHINA | ONLINE (CALL ENABLED) | 2014.4.10.13:45 | 1.2.2.3 |
| 01bb | TERMINAL BB, SHANGHAI BUSINESS OFFICE, CHINA | ONLINE (TEMPORARILY INTERRUPTED) | 2014.4.10.13:50 | 1.2.2.4 |
| ... | ... | ... | ... | ... |
| 01ca | TERMINAL CA, WASHINGTON D.C. BUSINESS OFFICE, U.S. | OFFLINE | 2014.4.10.12:45 | 1.3.1.3 |
| 01cb | TERMINAL CB, NEW YORK BUSINESS OFFICE, U.S. | ONLINE (IN CALL) | 2014.4.10.13:55 | 1.3.1.4 |
| ... | ... | ... | ... | ... |
| 01da | TERMINAL DA, BERLIN BUSINESS OFFICE, EUROPE | ONLINE (IN CALL) | 2014.4.08.12:45 | 1.3.2.3 |
| 01db | TERMINAL DB, LONDON BUSINESS OFFICE, EUROPE | ONLINE (CALL ENABLED) | 2014.4.10.12:45 | 1.3.2.4 |
| ... | ... | ... | ... | ... |

FIG.14

DESTINATION LIST CONTROL TABLE

| REQUST ORIGINATING TERMINAL ID | DESTINATION TERMINAL ID |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ... | ... |
| 01db | 01aa, 01ab, 01ba, ···, 01da, 01ca, 01cb, ···, 01da |

FIG.15

SESSION CONTROL TABLE

| SELECTING SESSION ID | RELAY DEVICE ID | REQUST ORIGINATING TERMINAL ID | DESTINATION TERMINAL ID | DELAY TIME (ms) | TIME AND DATE OF RECEPTION OF DELAY INFORMATION |
|---|---|---|---|---|---|
| se1 | 111c | 01aa | 01ba | 200 | 2009.11.10.14:00 |
| se1 | 111c | 01aa | 01db | 100 | 2009.11.10.14:02 |
| se2 | 111a | 01ba | 01ca | 50 | 2009.11.10.14:10 |
| ... | ... | ... | ... | ... | ... |

| TERMINAL ID | RELAY DEVICE ID | | | |
|---|---|---|---|---|
| | 111a | 111b | 111c | 111d |
| 01aa | 100 | 90 | 70 | 50 |
| 01ab | 100 | 90 | 70 | 50 |
| ... | ... | ... | ... | ... |
| 01ba | 80 | 100 | 70 | 90 |
| ... | ... | ... | ... | ... |
| 01db | 50 | 90 | 80 | 100 |
| ... | ... | ... | ... | ... |

FIG.18

QUALITY CONTROL TABLE

| DELAY TIME (ms) | IMAGE DATA IMAGE QUALITY (IMAGE QUALITY) |
| --- | --- |
| 0 TO 100 | HIGH IMAGE QUALITY |
| 100 TO 300 | MEDIUM IMAGE QUALITY |
| 300 TO 500 | LOW IMAGE QUALITY |
| 500 TO | (INTERRUPTED) |

FIG.25

|  |  | RELATIVE IMPORTANCE | RELAY DEVICE ID | | | |
|---|---|---|---|---|---|---|
|  |  |  | 111a | 111b | 111c | 111d |
| INDICES | RUNNING COST | 1 | 0.8 | 0.7 | 1 | 0.9 |
|  | RELIABILITY | 3 | 1 | 0.9 | 0.9 | 0.9 |
|  | DEVICE SCALE | 2 | 0.9 | 0.8 | 1 | 0.6 |
| COEFFICIENT (AVERAGE) |  | - | 0.9 | 0.8 | 0.97 | 0.8 |

TRANSMISSION CONTROL SYSTEM, TRANSMISSION SYSTEM, RELAY DEVICE SELECTING METHOD, COMPUTER PROGRAM PRODUCT, AND MAINTENANCE SYSTEM FOR SELECTING A PRIORITIZED RELAY DEVICE FOR COMMUNICATION BETWEEN TERMINALS

CROSS-REFERENCE TO RELATED APPLICATIONS

This application is a continuation of PCT international application Ser. No. PCT/JP2015/066127 filed on May 28, 2015 which designates the United States, and which claims the benefit of priority from Japanese Patent Application No. 2014-109772, filed on May 28, 2014 and Japanese Patent Application No. 2015-085865, filed on Apr. 20, 2015; the entire contents of which are incorporated herein by reference.

BACKGROUND OF THE INVENTION

1. Field of the Invention

The present invention relates to selection of a relay device that actually relays content data from among a plurality of relay devices that can relay content data transmitted among a plurality of transmission terminals.

2. Description of the Related Art

Television conference systems that conduct, for example, a television conference via a communication network, such as the Internet, are known as an example of a transmission system that transmits and receives content data to and from a plurality of transmission terminals via relay devices. In response to a recent trend toward reduction in expenses and time spent in business trips, there is a mounting need for such television conference systems. Such a television conference system typically includes a plurality of television conference terminals as exemplary transmission terminals. A television conference can be achieved by such television conference terminals that transmit and receive image data and sound data among themselves.

Recent efforts made toward enhancing a broadband environment have made possible transmission and reception of high-quality image data and high-sound-quality sound data. The condition of the remote end of the television conference can thus be more readily determined, so that the quality of communication through conversations has been improved.

When, for example, a large number of television conferences are conducted via the communication network or image data or sound data is received through a narrow-band path on the communication network, however, a delay occurs in reception of the image data or the sound data. When a delay of 0.5 seconds or longer occurs in the reception of the image data or the sound data, television conference system users are likely to feel stressed during conversations. As a result, the users are still not satisfied with the television conferences conducted in the recent enhanced broadband environment.

Additionally, recent television conference systems include a relay device that relays image data and sound data among the television conference terminals, for each local area network (LAN) in the communication network. Communication processing in a television conference can be distributed among these relay devices, so that load on each relay device can be reduced and the volume of image data and sound data to be relayed can be distributed.

Conventionally, a relay device connected to a LAN to which a television conference terminal that conducts a television conference is connected has been selected from among a plurality of relay devices. Specifically, a relay device having an IP address close to the IP address of the television conference terminal is selected to transmit and receive therethrough image data having high image quality, for example (see patent document 1 (Japanese Patent Application Laid-open No. 2008-227577)).

Communications for television conferences, for example, are performed not only within the same prefecture, but also over long distances in Japan, such as between Hokkaido and Okinawa, and across different countries, such as between Japan and the U.S.

Thus, when a relay device close to a first transmission terminal, such as a television conference terminal, is selected, the selected relay device is far away from a second transmission terminal, so that well-balanced high-quality content data cannot be transmitted or received under an actual communication network environment.

SUMMARY OF THE INVENTION

A transmission control system controls a plurality of transmission terminals. Each of the transmission terminals transmits and receives content data via a certain relay device. The transmission control system includes: a storage unit that stores therein zone identification information for identifying a zone in which each of the transmission terminals is used, and priority information that indicates a priority at which a transmission terminal indicated by the zone identification information should use each of a plurality of relay devices, in association with each other; a reception unit that receives, from a first transmission terminal that requests initiation of communication with a transmission terminal as a destination terminal, first zone identification information for identifying a zone in which the first transmission terminal is used and second zone identification information for identifying a zone in which a second transmission terminal as the destination terminal is used; and a selection unit that selects a relay device to be used for relaying the content data based on first priority information associated with the first zone identification information in the storage unit and second priority information associated with the second zone identification information in the storage unit.

BRIEF DESCRIPTION OF THE DRAWINGS

FIG. 10 is a conceptual diagram illustrating a coefficient table used for calculation of priorities;

FIG. 11 is a conceptual diagram illustrating a relay device control table;

FIG. 12 is a conceptual diagram illustrating an authentication control table;

FIG. 13 is a conceptual diagram illustrating a terminal control table;

FIG. 14 is a conceptual diagram illustrating a destination list control table;

FIG. 15 is a conceptual diagram illustrating a session control table;

FIG. 18 is a conceptual diagram illustrating a quality control table;

FIG. 25 is a conceptual diagram illustrating a coefficient table used for calculation of priorities according to a second embodiment of the present invention.

DETAILED DESCRIPTION OF THE PREFERRED EMBODIMENTS

First Embodiment

A first embodiment of the present invention will be described below with reference to FIGS. 1 to 24.

General Configuration of Embodiment

Figure 1:
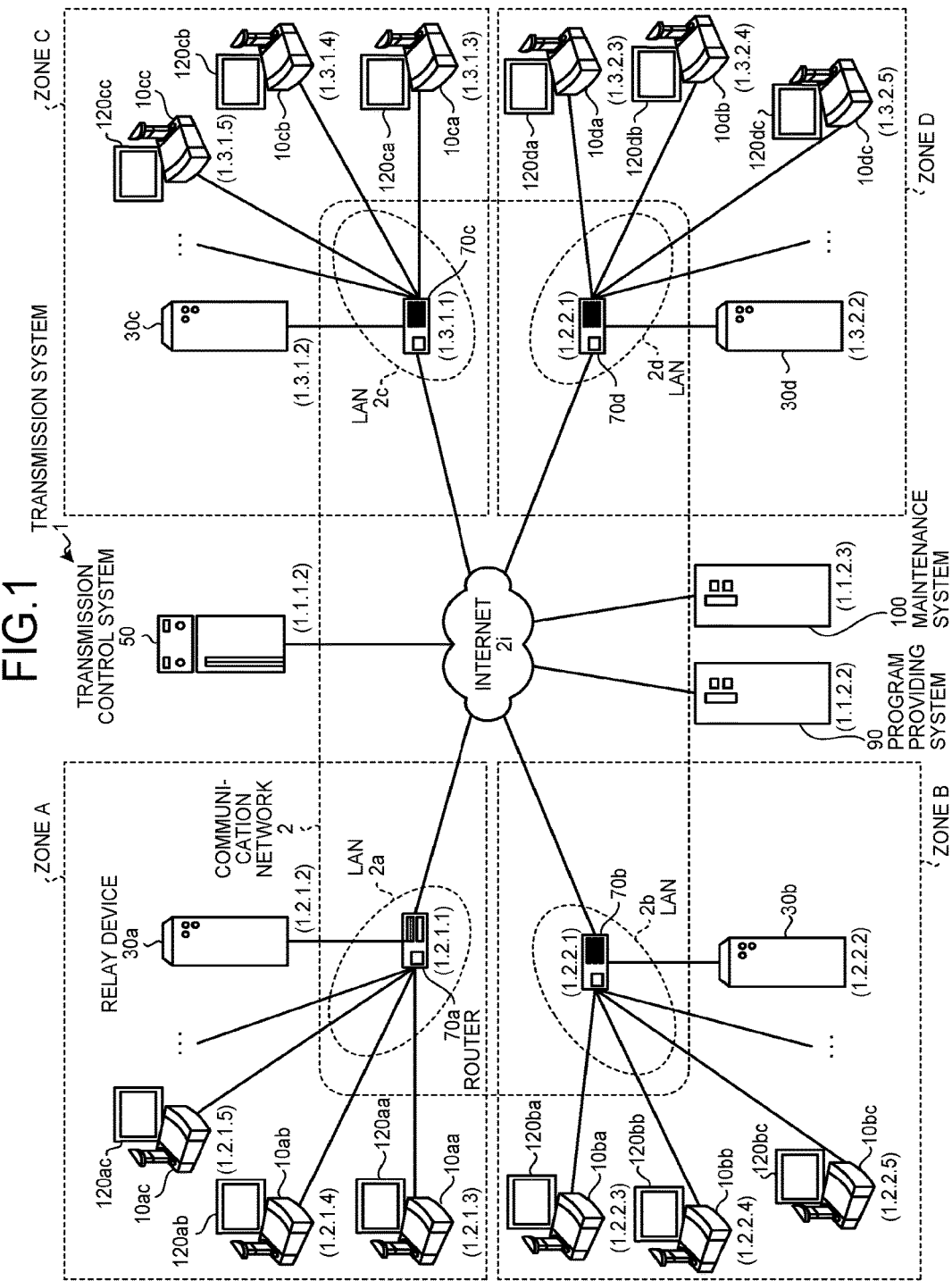
FIG. 1 is a schematic diagram illustrating a transmission system according to a first embodiment of the present invention.
Figure 2:
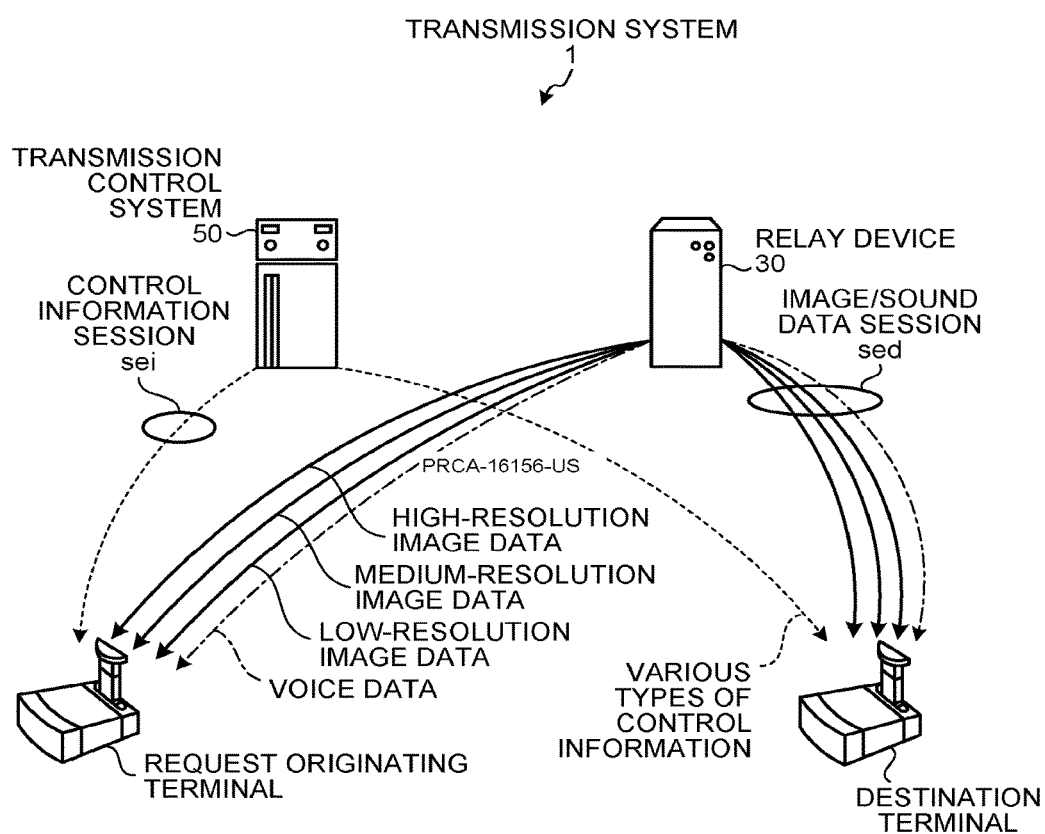
FIG. 2 is a conceptual diagram illustrating conditions in which image data, sound data, and various types of control information are transmitted and received in the transmission system.
Figure 3:
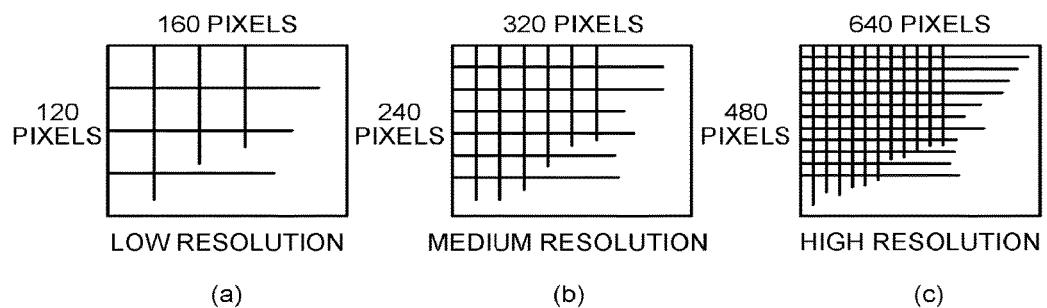
FIG. 3 is a conceptual diagrams illustrating image quality of the image data.

FIG. 1 is a schematic diagram illustrating a transmission system 1 according to the embodiment of the present invention. FIG. 2 is a conceptual diagram illustrating conditions in which image data, sound data, and various types of control information are transmitted and received in the transmission system. FIG. 3 is a conceptual diagrams illustrating image quality of the image data.

The transmission system includes a data providing system and a communication system. Specifically, the data providing system transmits content data unidirectionally from a first transmission terminal to a second transmission terminal via a transmission control system. The communication system conveys information, feelings, and the like among a plurality of transmission terminals via the transmission control system. The communication system is a system for conveying information, feelings, and the like among a plurality of communication terminals (that correspond to the "transmission terminals") via a communication control system (that corresponds to the "transmission control system"). Examples of the communication system include a television conference system and a video telephone system.

The embodiment assumes that the television conference system is an exemplary communication system, a television conference control system is an exemplary communication control system, and a television conference terminal is an exemplary communication terminal. The transmission system, the transmission control system, and the transmission terminal will be described on the foregoing assumption. Specifically, the transmission terminal and the transmission control system according to an embodiment of the present invention are applied not only to the television conference system, but also to the communication system or the transmission system.

The transmission system 1 illustrated in FIG. 1 includes a plurality of transmission terminals (10aa, 10ab, . . . ), displays (120aa, 120ab, . . . ) for the respective transmission terminals (10aa, 10ab, . . . ), a plurality of relay devices (30a, 30b, 30c, and 30d), a transmission control system 50, a program providing system 90, and a maintenance system 100.

The terminals 10 transmit and receive image data and sound data as exemplary content data.

In the following, the "transmission terminal" is simply denoted as a "terminal" and the transmission control system" is simply denoted as a "control system". Any given terminal out of the terminals (10aa, 10ab, . . . ) is denoted as a "terminal 10", any given display out of the displays (120aa, 120ab, . . . ) is denoted as a "display 120", and any given relay device out of the relay devices (30a, 30b, 30c, 30d) is denoted as a "relay device 30". Additionally, a terminal that originates a request for initiating a television conference is denoted as a "request originating terminal" and a terminal that receives (relays) the request is denoted as a "destination terminal".

As illustrated in FIG. 2, a control information session sei for transmitting and receiving various types of control information is established via the control system 50 between the request originating terminal and the destination terminal in the transmission system 1. In addition, four sessions for transmitting and receiving four types of data of high-resolution image data, medium-resolution image data, low-resolution image data, and sound data are established between the request originating terminal and the destination terminal via the relay device 30. In FIG. 2, the four sessions are collectively illustrated as an image/sound data session sed. The image/sound data session sed is not necessarily required to include four sessions and may include sessions more or less than four.

The following describes resolutions of images of the image data handled in the embodiment. Images with three different resolutions are available: an image with a low resolution of 160 horizontal pixels by 120 vertical pixels and serving as a base image as illustrated at (a) in FIG. 3; an image with a medium resolution of 320 horizontal pixels by 240 vertical pixels as illustrated at (b) in FIG. 3; and an image with a high resolution of 640 horizontal pixels by 480 vertical pixels as illustrated at (c) in FIG. 3. Among from these, the image data having low image quality including only the low-resolution image data serving as the base image is relayed when the image data is transmitted via a narrow-band path. The image data having medium image quality including the low-resolution image data serving as the base image and the medium-resolution image data is relayed when the bandwidth is relatively wide. The image data having high image quality including the low-resolution image data serving as the base image, the medium resolution image data, and the high-resolution image data is relayed when the bandwidth is extremely wide.

The relay device 30 illustrated in FIG. 1 relays content data among the terminals 10. The control system 50 centrally controls, for example, log-in authentication from the terminal 10, call status of the terminal 10, a destination list, and communication status of the relay device 30. The image data may be a moving image, a still image, or both.

A plurality of routers (70a, 70b, 70c, 70d, 70ab, and 70cd) select an optimum path for the image data and the sound data. In the following, any given router out of the routers (70a, 70b, 70c, 70d, 70ab, and 70cd) is denoted as a "router 70".

The program providing system 90 includes a hard disk (HD) 204 to be described later. Having a terminal program for causing the terminal 10 to achieve various functions (or causing the terminal 10 to function as specific means) stored in the HD 204, the program providing system 90 can transmit the terminal program to the terminal 10. The program providing system 90 further has a relay device program for causing the relay device 30 to achieve various functions (or causing the relay device 30 to function as specific means) stored in the HD 204, to thereby be able to transmit the relay device program to the relay device 30. Additionally, the program providing system 90 further has a transmission control program for causing the control system 50 to achieve various functions (or causing the control system 50 to function as specific means) stored in the HD 204, to thereby be able to transmit the transmission control program to the control system 50.

The maintenance system 100 is a computer for maintaining, controlling, or servicing at least one of the terminal 10, the relay device 30, the control system 50, and the program providing system 90. Consider a case in which the maintenance system 100 is installed in a domestic location, while the terminal 10, the relay device 30, the control system 50, or the program providing system 90 is installed in a foreign location. In this case, the maintenance system 100 performs a maintenance procedure, including a maintenance, control, or service task, for at least one of the terminal 10, the relay device 30, the control system 50, and the program providing system 90 remotely via a communication network 2. Alternatively, the maintenance system 100 performs a maintenance procedure, including control of a model number, a serial number, a sale destination, maintenance inspection, or a fault history, for at least one of the terminal 10, the relay device 30, the control system 50, and the program providing system 90, not via the communication network 2.

The terminals (10aa, 10ab, 10ac, . . . ), the relay device 30a, and the router 70a are connected by a LAN 2a in a manner of being capable of communicating. The terminals (10ba, 10bb, 10bc, . . . ), the relay device 30b, and the router 70b are connected by a LAN 2b in a manner of being capable of communicating. The LAN 2a and the LAN 2b are connected so as to be capable of communicating by a leased line 2ab in which the router 70ab is included and are built within a predetermined zone A. A zone A is, for example, Japan and the LAN 2a is built within a business office in Tokyo. A zone B is, for example, China and the LAN 2b is built within a business office in China.

The terminals (10ca, 10cb, 10cc, . . . ), the relay device 30c, and the router 70c are connected by a LAN 2c in a manner of being capable of communicating. The terminal 10d (a, 10db, 10dc, . . . ), the relay device 30d, and the router 70d are connected by a LAN 2d in a manner of being capable of communicating. The LAN 2c and the LAN 2d are connected so as to be capable of communicating by a leased line 2cd in which the router 70cd is included and are built within a predetermined zone B. A zone C is, for example, the U.S. and the LAN 2c is built within a business office in the U.S. A zone D is, for example, Europe and the LAN 2d is built within a business office in Europe. The routers (70a, 70b, 70c, and 70d) are connected via an Internet 2i in a manner of being capable of communicating.

The control system 50 and the program providing system 90 are connected to the terminal 10 and the relay device 30 via the Internet 2i in a manner of being capable of communicating. The control system 50 and the program providing system 90 may be installed in the zone A or the zone B, or any zone other than the zone A and the zone B.

In the embodiment, the LAN 2a, the LAN 2b, the Internet 2i, the LAN 2c, and the LAN 2d build the communication network 2 of the embodiment. In addition to a wired portion, the communication network 2 may include a portion in which wireless communications are performed using, for example, wireless fidelity (Wi-Fi) or Bluetooth (a registered trademark).

In FIG. 1, a set of four figures indicated below each of the terminal 10, the relay device 30, the control system 50, the router 70, and the program providing system 90 represents, in a simplified manner, an IP address in general IPv4. For example, the terminal 10aa has an IP address of "1.2.1.3". IPv6, instead of IPv4, may be used. For convenience sake, however, IPv4 is used throughout this description.

The terminal 10 may be used for calls made between parties within a room or between a party in an outdoor area and a party in an indoor area or between parties in outdoor areas, in addition to calls made between business offices or between different rooms within a single business office. The terminal 10 is used outdoor through wireless communications, such as a mobile phone communication network.

Hardware Configuration of Embodiment

Figure 4:
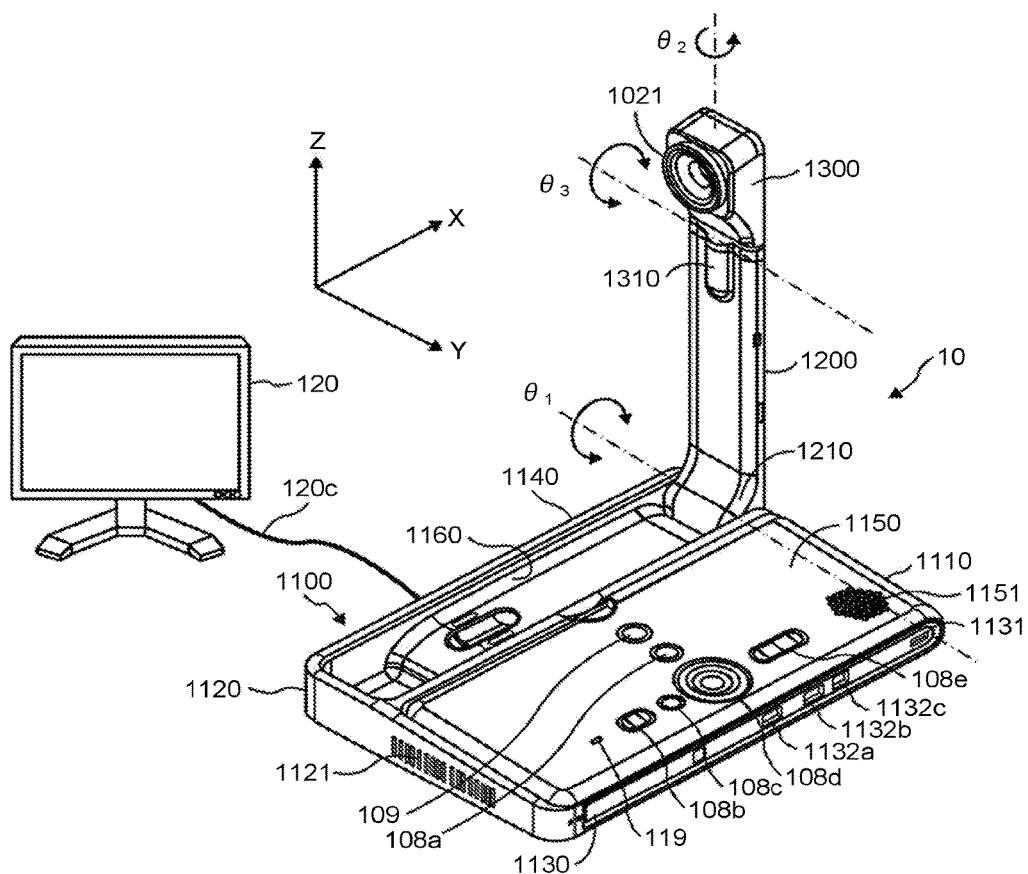
FIG. 4 is a diagram illustrating an appearance of a terminal according to the embodiment.

The following describes a hardware configuration of the embodiment. FIG. 4 is a diagram illustrating an appearance of the terminal 10 according to the embodiment. As illustrated in FIG. 4, the terminal 10 includes a housing 1100, an arm 1200, and a camera housing 1300. The housing 1100 has a front side wall surface 1110 and a rear side wall surface 1120. The front side wall surface 1110 has an intake surface, not illustrated, having a plurality of intake holes formed therein. The rear side wall surface 1120 has an exhaust surface 1121 having a plurality of exhaust holes formed therein. This arrangement allows an outside air in the rear of the call terminal 10 to be drawn in through the intake holes not illustrated and then to be discharged to the rear of the call terminal 10 through the exhaust surface 1121 through drive of a cooling fan built in the housing 1100. The housing 1100 has a right side wall surface 1130 that has a sound collecting hole 1131 formed therein. Various types of sounds including noise and pulsation can thereby be collected through a built-in microphone 114 to be described later.

The housing 1100 includes an operating panel 1150 formed on a side closer to the right side wall surface 1130. A plurality of operating buttons (108a to 108e) to be described later, a power switch 109 to be described later, and an alarm lamp 119 to be described later are disposed on the operating panel 1150. In addition, the operating panel 1150 further has a sound output surface 1151 formed of a plurality of sound output holes through which an output sound from a built-in speaker 115 to be described later passes. The housing 1100 further includes a housing section 1160 formed on a side closer to a left side wall surface 1140. The housing section 1160 serves as a recess for housing therein the arm 1200 and the camera housing 1300. The right side wall surface 1130 of the housing 1100 has a plurality of connection ports (1132a to 1132c) through which cables are electrically connected to an external device connection I/F 118 to be described later. The left side wall surface 1140 of the housing 1100 has a connection port, not illustrated, for electrically connecting a cable 120c for the display 120 to the external device connection I/F 118 to be described later.

In the following, any given operating button out of the operating buttons (108a to 108e) is denoted as an "operating button 108", and any given connection port out of the connection ports (1132a to 1132c) is denoted as a "connection port 1132".

The arm 1200 is mounted on the housing 1100 via a torque hinge 1210. The arm 1200 is rotatable in the vertical direction with respect to the housing 1100 over a range of a tilt angle θ1 of 135 degrees. FIG. 4 illustrates a condition in which the tilt angle θ1 is 90 degrees. The camera housing 1300 includes a built-in camera 112 to be described. The camera 112 can capture an image of, for example, a user, a document, or a room. The camera housing 1300 further includes a torque hinge 1310. The camera housing 1300 is mounted on the arm 1200 via the torque hinge 1310. With the angle illustrated in FIG. 4 being 0 degrees, the camera housing 1300 is rotatable in the vertical direction with respect to the arm 1200 in a range of a pan angle θ2 of ±180 degrees and a range of a tilt angle θ3 of ±45 degrees.

The diagram of FIG. 4 is only an example and should not to be construed to limit the appearance. The call terminal 10 may, for example, be a general-purpose PC, a smartphone, or a tablet terminal. The camera or the microphone is not necessarily required to be built in the terminal and may be externally mounted. The transmission control system 50 has an appearance identical to those of common server computers and thus a description of the appearance thereof will be omitted.

Figure 5:
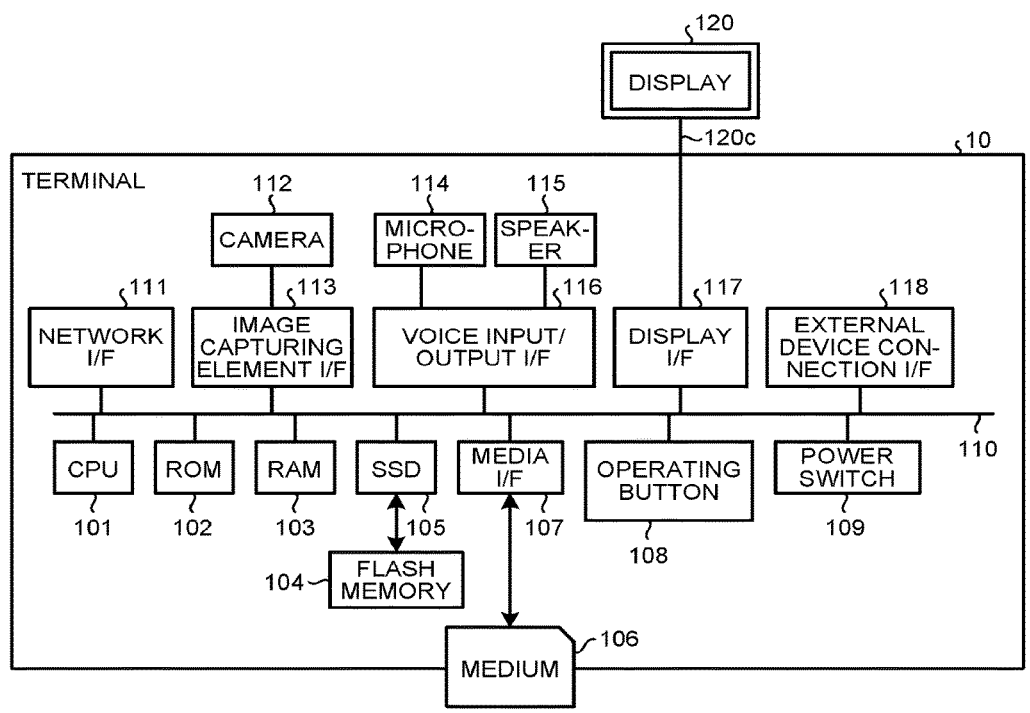
FIG. 5 is a hardware configuration diagram illustrating the terminal according to the embodiment.

FIG. 5 is a hardware configuration diagram illustrating the terminal 10 according to the embodiment of the present invention. As illustrated in FIG. 5, the terminal 10 includes a central processing unit (CPU) 101, a read only memory (ROM) 102, a random access memory (RAM) 103, a flash memory 104, a solid state drive (SSD) 105, a media I/F 107, the operating button 108, the power switch 109, and a network interface (I/F) 111. Specifically, the CPU 101 controls general operations of the terminal 10. The ROM 102 stores therein a program used for driving the CPU 101, such as an initial program loader (IPL). The RAM 103 is used as a work area for the CPU 101. The flash memory 104 stores therein the terminal program and various types of data including image data and sound data. The SSD 105 controls a read or write operation of various types of data from or to the flash memory 104, as controlled by the CPU 101. The media I/F 107 controls a read or write (store) operation from or to a recording medium 106, such as the flash memory 104. The operating button 108 is operated, for example, to select a destination terminal 10. The power switch 109 turns on or off the power of the terminal 10. The network I/F 111 transmits data using the communication network 2.

The terminal 10 further includes the built-in camera 112, an image capturing element I/F 113, the built-in microphone 114, the built-in speaker 115, a voice input/output I/F 116, a display I/F 117, the external device connection I/F 118, and a bus line 110. Specifically, the camera 112 captures an image of an object as controlled by the CPU 101 to thereby acquire image data. The image capturing element I/F 113 controls drive of the camera 112. The microphone 114 inputs voice. The speaker 115 outputs voice. The voice input/output I/F 116 processes input and output of voice signals between the microphone 114 and the speaker 115 as controlled by the CPU 101. The display I/F 117 transmits image data to the external display 120 as controlled by the CPU 101. The external device connection I/F 118 connects various types of external devices. The bus line 110, including an address bus and a data bus, electrically connects the abovementioned components as illustrated in FIG. 5.

The display 120 is formed of a liquid crystal or organic EL material and displays, for example, an image of an object and an operating icon. The display 120 is connected to the display I/F 117 through the cable 120c. The cable 120c may be an analog RGB (VGA) signal cable, a component video cable, or a high-definition multimedia interface (HDMI) or digital video interactive (DVI) signal cable.

The camera 112 includes a lens and a solid-state image sensing element that converts light into an electric charge to thereby digitize the image (video) of the object. As the solid-state image sensing element, a complementary metal oxide semiconductor (CMOS), a charge coupled device (CCD), and the like may be used.

An external camera, an external microphone, an external speaker, and other external devices can be each connected to the external device connection I/F 118 using, for example, a universal serial bus (USB) cable. When an external camera is connected, the external camera is driven preferentially over the built-in camera 112 as controlled by the CPU 101. Similarly, when an external microphone or an external speaker is connected, the external microphone or the external speaker is driven preferentially over the built-in microphone 114 or the built-in speaker 115 as controlled by the CPU 101.

The recording medium 106 is configured to be removable from the terminal 10. The flash memory 104 is only required to be a nonvolatile memory that reads and writes data in accordance with instructions from the CPU 101 and thus may be an electrically erasable and programmable ROM (EEPROM), for example.

The abovementioned terminal program may be distributed by being recorded as a file in an installable or executable format in a computer-readable recording medium, such as the recording medium 106. The terminal program may even be stored in the ROM 102 instead of the flash memory 104.

Figure 6:
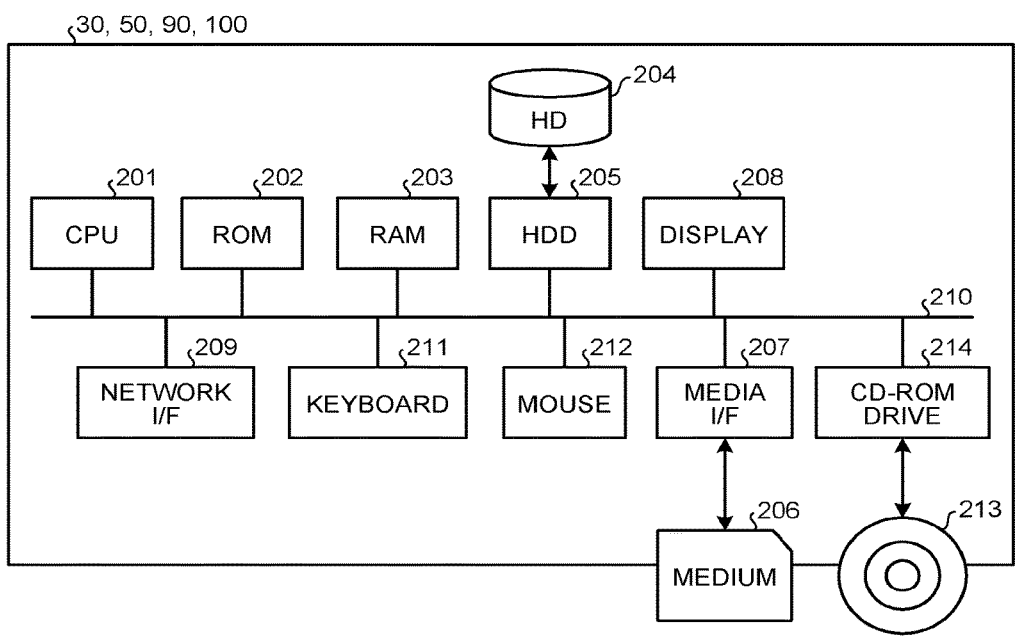
FIG. 6 is a hardware configuration diagram illustrating a control system, a relay device, or a program providing system according to the embodiment.

FIG. 6 is a hardware configuration diagram illustrating the control system 50 according to the embodiment of the present invention. The control system 50 includes a CPU 201, a ROM 202, a RAM 203, the HD 204, a hard disk drive (HDD) 205, a media I/F 207, a display 208, a network I/F 209, a keyboard 211, a mouse 212, a CD-ROM drive 214, and a bus line 210. Specifically, the CPU 201 controls general operations of the control system 50. The ROM 202 stores therein a program used for driving the CPU 201, such as the IPL. The RAM 203 is used as a work area for the CPU 201. The HD 204 stores therein various programs including the transmission control program. The HDD 205 controls a read or write operation of various types of data from or to the HD 204, as controlled by the CPU 201. The media I/F 207 controls a read or write (store) operation from or to a recording medium 206, such as the flash memory. The display 208 displays various types of information, such as a cursor, a menu, a window, a character, and an image. The network I/F 209 transmits data using the communication network 2. The keyboard 211 includes a plurality of keys for inputting a character, a numeral, an instruction, and the like. The mouse 212 selects or executes an instruction, selects a specific object to be processed, moves the cursor, and performs related functions. The CD-ROM drive 214 controls a read or write operation of various types of data from or to a compact disc read only memory (CD-ROM) 213 as an example of a removable recording medium. The bus line 210, including an address bus and a data bus, electrically connects the abovementioned components as illustrated in FIG. 6.

The abovementioned transmission control program may be distributed by being recorded as a file in an installable or executable format in a computer-readable recording medium, such as the recording medium 206 and the CD-ROM 213. The transmission control program may even be stored in the ROM 202 instead of the HD 204.

The relay device 30 has a hardware configuration similar to that of the control system 50 and a description therefor will be omitted. It is, however, noted that the HD 204 records therein a relay device program for controlling the relay device 30. In this case, too, the relay device program may be distributed by being recorded as a file in an installable or executable format in a computer-readable recording medium, such as the recording medium 206 and the CD-ROM 213. The relay device program may even be stored in the ROM 202 instead of the HD 204.

The program providing system 90 and the maintenance system 100 each have a hardware configuration similar to that of the control system 50 and a description therefor will be omitted. It is, however, noted that the HD 204 records therein a program providing program for controlling the program providing system 90. In this case, too, the program providing program may be distributed by being recorded as a file in an installable or executable format in a computer-readable recording medium, such as the recording medium 206 and the CD-ROM 213. The program providing system program may even be stored in the ROM 202 instead of the HD 204.

As other examples of the above-described removable recording medium, a computer-readable recording medium, such as a compact disc recordable (CD-R), a digital versatile disc (DVD), and a Blu-ray Disc, in which the program files are recorded, may be distributed.

Functional Configuration of Embodiment

Figure 7:
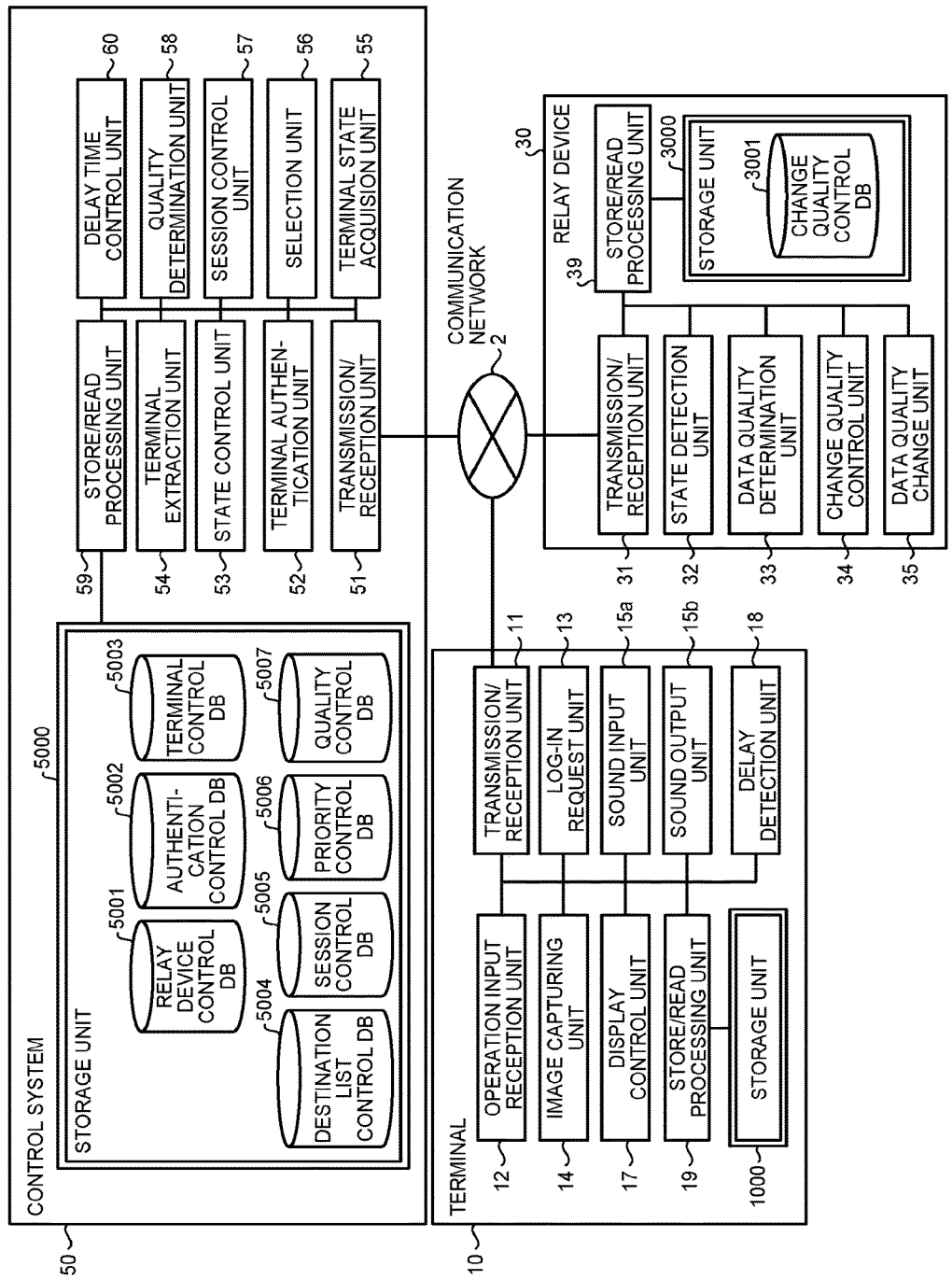
FIG. 7 is a functional block diagram of each of the terminals, devices, and the systems that are included in the transmission system according to the embodiment.

The following describes a functional configuration of the embodiment. FIG. 7 is a functional block diagram of each of the terminals, devices, and the systems that are included in the transmission system 1 of the embodiment. In FIG. 7, the terminal 10, the relay device 30, and the control system 50 are connected via the communication network 2 so as to be able to perform data communication. FIG. 7 omits the program providing system 90 illustrated in FIG. 1 because the program providing system 90 does not play a direct role in television conference communication.

Functional Configuration of Terminal

The terminal 10 includes a transmission/reception unit 11, an operation input reception unit 12, a log-in request unit 13, an image capturing unit 14, a sound input unit 15a, a sound output unit 15b, a display control unit 17, a delay detection unit 18, and a store/read processing unit 19. Each of these modules is configured as a specific function achieved by any one of the components illustrated in FIG. 5 when such a component is operated by an instruction from the CPU 101 in accordance with a terminal program read from the flash memory 104 and loaded on the RAM 103, or a specific module configured to perform that specific function. The terminal 10 further includes a storage unit 1000 including the RAM 103 illustrated in FIG. 5 and the flash memory 104 illustrated in FIG. 5.

Configuration of Each Function of Terminal

The following describes in detail a configuration of each of the functions of the terminal 10 with reference to FIGS. 5 and 7. In describing the functional configuration of the terminal 10, the specific function achieved by the terminal 10 will be described with reference also to the major components illustrated in FIG. 5.

The transmission/reception unit 11 of the terminal 10 illustrated in FIG. 7 is achieved by an instruction from the CPU 101 illustrated in FIG. 5 and by the network I/F 111 illustrated in FIG. 5, and transmits and receives various types of data (or information) to and from another terminal, device, or system via the communication network 2. Before a call to a desired destination terminal is initiated, the transmission/reception unit 11 starts receiving from the control system 50 state information that indicates a state of each terminal as a destination candidate. The state information indicates detailed states including, not only an operating state (whether online or offline) of each terminal 10, but also whether a call can be made even in the online state, whether the line is in call, and whether a person at the remote terminal is away. In addition to the operating state of each terminal 10, the state information further indicates various other conditions including those in which the cable 120c is disconnected from the terminal 10, voice is output but not the image, and voice is not to be output (MUTE). The following assumes an exemplary case in which the state information indicates the operating state.

The operation input reception unit 12 is achieved by an instruction from the CPU 101 illustrated in FIG. 5 and by the operating button 108 and the power switch 109 illustrated in FIG. 5, and receives various inputs by the user. For example, when the user turns on the power switch 109 illustrated in FIG. 5, the operation input reception unit 12 illustrated in FIG. 7 receives the input of turning on the power switch 109 and then turns the power on.

The log-in request unit 13 is achieved by an instruction from the CPU 101 illustrated in FIG. 5. Upon the reception of the input of turning on the power switch 109, the log-in request unit 13 causes the transmission/reception unit 11 to automatically transmit via the communication network 2 log-in request information that indicates a request for a log-in and the current IP address of the request originating terminal to the control system 50. When the user places the power switch 109 in an OFF position from an ON position, the transmission/reception unit 11 transmits information indicating the turning off of the power to the control system 50 before the operation input reception unit 12 turns power off completely. These operations allow the control system 50 to determine that the terminal 10 has been turned off from an ON status.

The image capturing unit 14 is achieved by an instruction from the CPU 101 illustrated in FIG. 5 and by the camera 112 and the image capturing element I/F 113 illustrated in FIG. 5, and captures an image of an object to output image data acquired through the image capturing.

The sound input unit 15a is achieved by an instruction from the CPU 101 illustrated in FIG. 5 and by the voice input/output I/F 116 illustrated in FIG. 5. After the microphone 114 converts a user voice into a corresponding voice signal, the sound input unit 15a inputs sound data of the voice signal. The sound output unit 15b is achieved by an instruction from the CPU 101 illustrated in FIG. 5 and by the voice input/output I/F 116 illustrated in FIG. 5 and outputs the voice signal of the sound data to the speaker to thereby output the voice from the speaker 115.

The display control unit 17 is achieved by an instruction from the CPU 101 illustrated in FIG. 5 and by the display I/F 117 illustrated in FIG. 5. As will be later described, the display control unit 17 performs control for combining received image data items having different resolutions and transmits the combined image data to the display 120. The display control unit 17 can cause the display 120 to display a destination list by transmitting information on the destination list received from the control system 50 to the display 120.

The delay detection unit 18 is achieved by an instruction from the CPU 101 illustrated in FIG. 5 and detects delay time (ms) of image data or sound data transmitted from another terminal 10 via the relay device 30.

The store/read processing unit 19 is executed by an instruction from the CPU 101 illustrated in FIG. 5 and by the SSD 105 illustrated in FIG. 5 and achieved by an instruction from the CPU 101 illustrated in FIG. 5. The store/read processing unit 19 performs processing for storing various types of data in, and reading the various types of data from, the storage unit 1000. The storage unit 1000 stores therein a terminal identification (ID), a password, and the like for identifying the terminal 10. The storage unit 1000 further stores therein image data and sound data received during a call to a destination terminal and overwritten each time such data is received. The display 120 displays thereon an image of the image data before the image data is overwritten and the speaker 115 outputs voice before the sound data is overwritten.

The terminal ID and a relay device ID to be described later in the embodiment indicate identification information including a language, a character, a symbol, or various marks used for uniquely identifying the terminal 10 and the relay device 30. Additionally, the terminal ID and the relay device ID each may be identification information that combines at least two of the language, the character, the symbol, and the various marks.

A user ID for identifying the user of the terminal 10 may be used instead of the terminal ID. In this case, the terminal identification information includes the user ID in addition to the terminal ID.

Functional Configuration of Relay Device

The relay device 30 includes a transmission/reception unit 31, a state detection unit 32, a data quality determination unit 33, a change quality control unit 34, a data quality change unit 35, and a store/read processing unit 39. Each of these modules is configured as a specific function achieved by any one of the components illustrated in FIG. 6 when such a component is operated by an instruction from the CPU 201 in accordance with a relay device program read from the HD 204 and loaded on the RAM 203, or a specific module configured to perform that specific function. The relay device 30 further includes a storage unit 3000 including the RAM 203 illustrated in FIG. 6 and/or the HD 204 illustrated in FIG. 6.

Change Quality Control Table

Figures 8, 9:
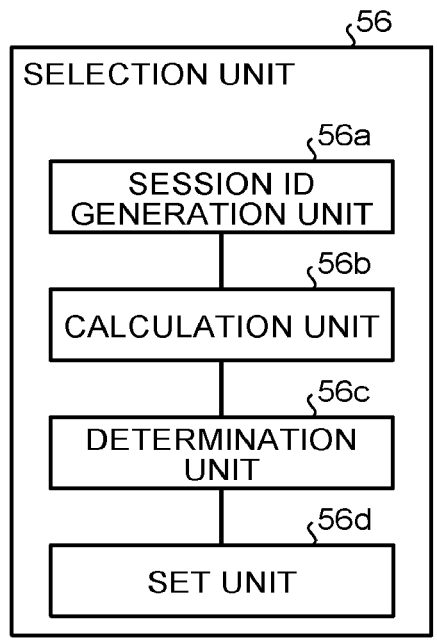
FIG. 8 is a functional configuration diagram of a selection unit.
FIG. 9 is a conceptual diagram illustrating a change quality control table.

The storage unit 3000 includes a change quality control database (DB) 3001 built therein. The change quality control DB 3001 includes a change quality control table as illustrated in FIG. 9. The change quality control table controls the IP address of the terminal 10 as a relay destination (destination) of the image data, associated with the image quality of the image data relayed by the relay device 30 to the relay destination.

Configuration of Each Function of Relay Device

The following describes in detail a configuration of each of the functions of the relay device 30. In describing the functional configuration of the relay device 30, the specific function achieved by the relay device 30 will be described with reference also to the major components illustrated in FIG. 6.

The transmission/reception unit 31 of the relay device 30 illustrated in FIG. 7 is achieved by an instruction from the CPU 201 illustrated in FIG. 6 and by the network I/F 209 illustrated in FIG. 6, and transmits and receives various types of data (or information) to and from another terminal, device, or system via the communication network 2.

The state detection unit 32 is achieved by an instruction from the CPU 201 illustrated in FIG. 6 and detects an operating state of the relay device 30 that includes the state detection unit 32. The operating state may be "online", "offline", "in call", or "temporarily interrupted".

The data quality determination unit 33 is achieved by an instruction from the CPU 201 illustrated in FIG. 6. The data quality determination unit 33, using the IP address of the destination terminal as a search key, searches the change quality control DB 3001 (see FIG. 9) and extracts image quality of the corresponding image data to be relayed to thereby determine the image quality of the image data to be relayed.

The change quality control unit 34 is achieved by an instruction from the CPU 201 illustrated in FIG. 6 and changes contents of the change quality control DB 3001 on the basis of quality information to be described later that is transmitted from the control system 50. Assume, for example, a situation in which a television conference is conducted through transmission and reception of image data with a high image quality between a request originating terminal (the terminal 10aa) having a terminal ID of "01aa" and a destination terminal (the terminal 10db) having a terminal ID of "01db". While this television conference is being conducted, another request originating terminal (the terminal 10bb) and another destination terminal (the terminal 10ca) may initiate another television conference via the communication network 2, which may introduce delay to the reception of the image data by the destination terminal (the terminal 10db). In such a case, the relay device 30 degrades the image quality of the image data that has so far been relayed from the high image quality to a medium image quality. In such a case, the contents of the change quality control DB 3001 is changed so as to degrade the image quality of the image data relayed by the relay device 30 from the high image quality to the medium image quality in accordance with the quality information indicating the medium image quality.

The data quality change unit 35 is achieved by an instruction from the CPU 201 illustrated in FIG. 6 and changes the image quality of the image data transmitted from the transmission originating terminal in accordance with the contents of the change quality control DB 3001 changed as described above.

The store/read processing unit 39 is achieved by an instruction from the CPU 201 illustrated in FIG. 6 and by the HDD 205 illustrated in FIG. 6. The store/read processing unit 39 performs processing for storing various types of data in, and reading the various types of data from, the storage unit 3000.

Functional Configuration of Control System

The control system 50 includes a transmission/reception unit 51, a terminal authentication unit 52, a state control unit 53, a terminal extraction unit 54, a terminal state acquisition unit 55, a selection unit 56, a session control unit 57, a quality determination unit 58, a store/read processing unit 59, and a delay time control unit 60. Each of these modules is configured as a specific function achieved by any one of the components illustrated in FIG. 6 when such a component is operated by an instruction from the CPU 201 in accordance with a control system program read from the HD 204 and loaded on the RAM 203, or a specific module configured to perform that specific function. The control system 50 further includes a storage unit 5000 including the HD 204 illustrated in FIG. 6.

Relay Device Control Table

The storage unit 5000 includes a relay device control DB 5001 built therein. The relay device control DB 5001 includes a relay device control table as illustrated in FIG. 11. The relay device control table controls the relay device ID assigned to each relay device 30 by associating the relay device ID with an operating state of the relay device 30, time and date when the control system 50 receives state information that indicates the operating state, an IP address of the relay device 30, a maximum data transmission rate (Mbps) in the relay device 30, and a coefficient used when the relay device 30 is selected. In the relay device control table illustrated in FIG. 11, for example, the relay device 30a having a relay device ID of "111a" is associated with information that: its operating state is "online"; the time and date when the control system 50 receives its state information is "13:00 on Nov. 10, 2009"; its IP address is "1.2.1.2"; the maximum data transmission rate therein is 100 Mbps; and its coefficient is "0.93".

The following describes the coefficient listed in the relay device control table. The coefficient is used when priority in selecting the relay device 30 is calculated. A larger coefficient indicates that the specific relay device 30 is more likely to be selected. The coefficient is derived from an average of each of indices listed in FIG. 10. FIG. 10 is a conceptual diagram illustrating a coefficient table used in the calculation of priorities.

As listed in FIG. 10, an administrator, for example, of the control system 50 sets a value of each index for each relay device ID. In FIG. 10, the indices are exemplified by a running cost, reliability, and a device scale. Specifically, the running cost refers to expenses incurred for servicing and maintaining the relay device 30. The reliability indicates a tendency toward a failure or a fault occurring in the relay device 30, and, for example, a mean time between failures. The device scale represents a scale of hardware and software. An increased number of terminals 10 calls for a greater scale. For the relay device ID "111a", for example, its running cost is "0.8", its reliability is "1", and its device scale is "0.9", so that the coefficient as the average of the three is 0.9 (=(0.8+1+0.9)/3).

Authentication Control Table

The storage unit 5000 further includes an authentication control DB 5002 built therein. The authentication control DB 5002 includes an authentication control table as illustrated in FIG. 12. The authentication control DB 5002 controls each of the terminals 10 controlled by the control system 50 by associating a unique password with each terminal ID. For example, the authentication control table illustrated in FIG. 12 indicates that the terminal 10aa has a terminal ID of "01aa" and a password of "aaaa".

Terminal Control Table

The storage unit 5000 further includes a terminal control DB 5003 built therein. The terminal control DB 5003 includes a terminal control table as illustrated in FIG. 13. The terminal control table controls the terminal ID assigned to each terminal 10 by associating the terminal ID with a destination name of the terminal 10 to which a call is addressed, an operating state of the terminal 10, time and date when the control system 50 receives log-in request information to be described later, and an IP address of the terminal 10. In the terminal control table illustrated in FIG. 13, for example, the terminal 10aa having a terminal ID of "01aa" is associated with information that: its terminal name is "terminal AA, Tokyo Business Office, Japan", its operating state is "online (call enabled)"; the time and date when the control system 50 receives the log-in request information is "13:40 on Nov. 10, 2009"; and its IP address is "1.2.1.3".

Destination List Control Table

The storage unit 5000 further includes a destination list control DB 5004 built therein. The destination list control DB 5004 includes a destination list control table as illustrated in FIG. 14. The destination list control table controls each terminal ID of the request originating terminal that requests the initiation of a call in a television conference, associated with all terminal IDs of the destination terminals registered as candidates for the destination terminals. The destination list control table illustrated in FIG. 14, for example, indicates that the candidates for the destination terminals (the terminal 10db) of which the request originating terminal (the terminal 10aa) having a terminal ID of "01aa" can request the initiation of a call in the television conference are the terminal 10ab having a terminal ID of "01ab", the terminal 10ba having a terminal ID of "01ba", the terminal 10bb having a terminal ID of "01bb", and the like. The candidates for the destination terminals are updated through addition or deletion as a result of a corresponding request made from any request originating terminal to the control system 50.

Session Control Table

The storage unit 5000 further includes a session control DB 5005 built therein. The session control DB 5005 includes a session control table as illustrated in FIG. 15. The session control table controls each selecting session ID used for execution of a session for selecting the relay device 30, associated with a relay device ID of the relay device 30 used for relaying image data and sound data, a terminal ID of the request originating terminal, a terminal ID of the destination terminal, delay time (ms) in receiving the image data at the destination terminal, and time and date when the control system 50 receives delay information indicating the delay time from the destination terminal. Consider, for example, a case in which use of the selecting ID "se1" results in calls being made among the three terminals (10aa, 10ba, and 10db) via the relay device 30c. In the session control table illustrated in FIG. 15, the record of the first row and the record of the second row are stored. Specifically, the record in the first row indicates that the relay device 30c (the relay device ID "111c") selected in the session executed using the selecting session ID "se1" relays between the request originating terminal (terminal 10aa) having a terminal ID of "01aa" and the destination terminal (terminal 10ba) having a terminal ID of "01ba". The record in the second row indicates that the relay device 30c (the relay device ID "111c") selected in the session executed using the selecting session ID "se1" relays between the request originating terminal (terminal 10aa) having a terminal ID of "01aa" and the destination terminal (terminal 10db) having a terminal ID of "01db".

Priority Control Table

Figures 16, 17:
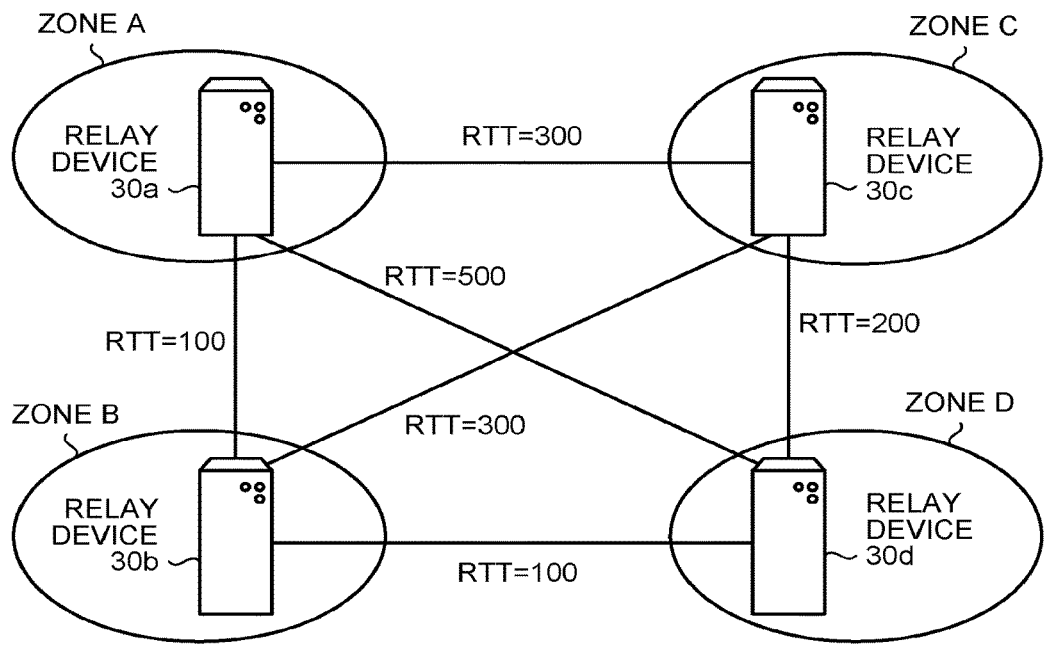
FIG. 16 is a conceptual diagram illustrating a priority control table.
FIG. 17 is a conceptual diagram illustrating RTT among the relay devices in a communication network.

The storage unit 5000 further includes a priority control DB 5006 built therein. The priority control DB 5006 includes a priority control table as illustrated in FIG. 16. The priority control table controls priority information that indicates a priority given when a specific relay device 30 is selected for each terminal 10, indicating each terminal ID associated with priorities of a plurality of relay devices 30 to be used by the terminal 10 represented by each terminal ID. In the priority control table, a larger value of the priority indicates a higher priority. Take, for example, the terminal 10aa (terminal ID "01aa"). The priority control table indicates that, out of the relay devices 30, the relay device 30a (relay device ID "111a") having a priority of "100" is to desirably be given top priority, followed by the relay device 30b (relay device ID "111b") having a priority of "90", the relay device 30c (relay device ID "111c") having a priority of "70", and the relay device 30d (relay device ID "111d") having a priority of "50".

The terminal ID "01ab" is composed of, following "01", a zone ID "a" indicating the zone, followed by "b" to identify a specific terminal. In other words, the priority control table in FIG. 16 controls each zone ID by associating the zone ID with priorities of a plurality of relay devices 30 to be used by each terminal 10. The zone ID is also used as an ID for identifying a specific group.

The priority of each terminal 10 is set on the basis of round trip time (RTT) to be described later. The control system 50 centrally controls the priorities of all terminals 10. In the priority control table illustrated in FIG. 16, for example, the priority of the relay device 30a having the relay device ID "111a" is set, for the terminal 10aa having the terminal ID "01aa", to "100" over the priorities (90, 70, and 50) of the other relay devices (30b, 30c, and 30d) represented by the respective relay device IDs ("111b", "111c", and "111d").

The following describes the RTT with reference to FIG. 17. FIG. 17 is a conceptual diagram illustrating the RTT among the relay devices in the communication network. The RTT indicates time required for transmission and reception when a first relay device 30 transmits ping to a second relay device 30. FIG. 17 illustrates, for example, that the transmission of ping from the relay device 30a installed in zone A to the relay device 30b installed in zone B takes RTT=100 (ms). Each priority is calculated using Expression (1).

$$100-(RTT/10) \qquad (1)$$

The RTT is calculated as being 0 for, for example, the terminal 10aa and the relay device 30a that are installed in the same zone A. For example, the priority when the relay device 30b in zone B is selected is 90 (=100−(100/10) for the terminal 10 in zone A.

FIG. 16 illustrates the zone ID included in the terminal ID. This is, however, not the only possible arrangement and the terminal ID and the zone ID may be controlled in different fields from each other.

Quality Control Table

The storage unit 5000 further includes a quality control DB 5007 built therein. The quality control DB 5007 includes a quality control table as illustrated in FIG. 18. The quality control table controls the delay time of the image data by associating the delay time with the image quality of the image data (image quality) so that the image quality of the image data relayed by the relay device 30 is degraded for a longer delay time (ms) of the image data in the request originating terminal or the destination terminal.

Configuration of Each Function of Control System

The following describes in detail a configuration of each of the functions of the control system 50. In describing the functional configuration of the control system 50, the specific function achieved by the control system 50 will be described with reference also to the major components illustrated in FIG. 6.

The transmission/reception unit 51 is executed by an instruction from the CPU 201 illustrated in FIG. 6 and by the network I/F 209 illustrated in FIG. 6, and transmits and receives various types of data (or information) to and from another terminal, device, or system via the communication network 2.

The terminal authentication unit 52 is achieved by an instruction from the CPU 201 illustrated in FIG. 6 and performs terminal authentication. In performing the terminal authentication, the terminal authentication unit 52 searches the authentication control DB 5002 of the storage unit 5000 using as a search key a terminal ID and a password included in the log-in request information received via the transmission/reception unit 51 to thereby determine whether the authentication control DB 5002 controls a terminal ID and a password identical to the terminal ID and the password included in the log-in request information.

The state control unit 53 is achieved by an instruction from the CPU 201 illustrated in FIG. 6. In order to control the operating state of a request originating terminal that has made a log-in request, the state control unit 53 stores in the terminal control DB 5003 (see FIG. 13) the terminal ID of the request originating terminal by associating the same with the operating state of the request originating terminal, the time and date when the control system 50 receives the log-in request information, and the IP address of the request originating terminal. In addition, on the basis of the state information indicating that the power is turned off and transmitted from the terminal 10 as the user places the power switch 109 of the terminal 10 in the OFF position from the ON position, the state control unit 53 changes the operating state indicating the online state to the offline state in the terminal control DB 5003 (see FIG. 13).

The terminal extraction unit 54 is achieved by an instruction from the CPU 201 illustrated in FIG. 6. The terminal extraction unit 54, using as the key the terminal ID of the request originating terminal that has made a log-in request, searches the destination list control DB 5004 (see FIG. 14) and reads a terminal ID of a destination terminal candidate to which a call with the request originating terminal is enabled, thereby extracting the terminal ID. In addition, using as the key the terminal ID of the request originating terminal that has made a log-in request, the terminal extraction unit 54 searches the destination list control DB 5004 (see FIG. 14) and extracts also a terminal ID of another request originating terminal that has the terminal ID of the above-mentioned request originating terminal registered as a destination terminal candidate.

The terminal state acquisition unit 55 is achieved by an instruction from the CPU 201 illustrated in FIG. 6. Using as the search key the terminal IDs of the destination terminal candidates extracted by the terminal extraction unit 54, the terminal state acquisition unit 55 searches the terminal control DB 5003 (see FIG. 13) and reads the operating state for each terminal ID extracted by the terminal extraction unit 54. The terminal state acquisition unit 55 can thereby acquire the operating states of the destination terminal candidates to which a call with the request originating terminal that has made the log-in request is enabled. The terminal state acquisition unit 55 also acquires the operating state of the request originating terminal that has made the log-in request by searching the terminal control DB 5003 with the terminal IDs extracted by the terminal extraction unit 54 used as the search key.

The selection unit 56 is achieved by an instruction from the CPU 201 illustrated in FIG. 6 and performs processing to select a single relay device 30 from among a plurality of relay devices 30. To perform the processing, the selection unit 56 achieves a session ID generation unit 56a, a calculation unit 56b, a determination unit 56c, and a set unit 56d as illustrated in FIG. 8 by instructions from the CPU 201 illustrated in FIG. 5.

The session ID generation unit 56a generates a selecting session ID used for execution of a session for selecting the relay device 30.

The calculation unit 56b totals priorities to thereby derive a total priority for each relay device ID. In FIG. 16, for example, with the three terminals (10aa, 10ba, and 10db) having the terminal IDs "01aa", "01ba", and "01db", respectively, priorities for selecting the relay device 30a having the relay device ID "111a" are "100", "80", and "50", respectively. The total priority is thus 230 (=100+80+50).

Then, the calculation unit 56b multiplies each total priority by the coefficient illustrated in FIG. 11. For example, the coefficient of the relay device 30a having the relay device ID "111a" is "0.9", so that the final total priority is 207 (=230×0.9).

The determination unit 56c determines whether, of the total priorities after the multiplication by the coefficient, the greatest total priority value is only one.

The set unit 56d sets, out of the relay device IDs, the specific relay device ID with the greatest total priority value among the total priorities after the multiplication by the coefficient. If a plurality of greatest total priority values are involved, the set unit 56d sets any given relay device ID among the relay device IDs having the greatest total priority values.

The calculation unit 56b is not necessarily required to use the coefficient. Specifically, the calculation unit 56b is not required to multiply the total priority by the coefficient. In this case, the set unit 56d sets, out of the relay device IDs, the specific relay device ID with the greatest total priority value among the total priorities without the multiplication by the coefficient.

Processing or Operations of Embodiment

Figure 19:
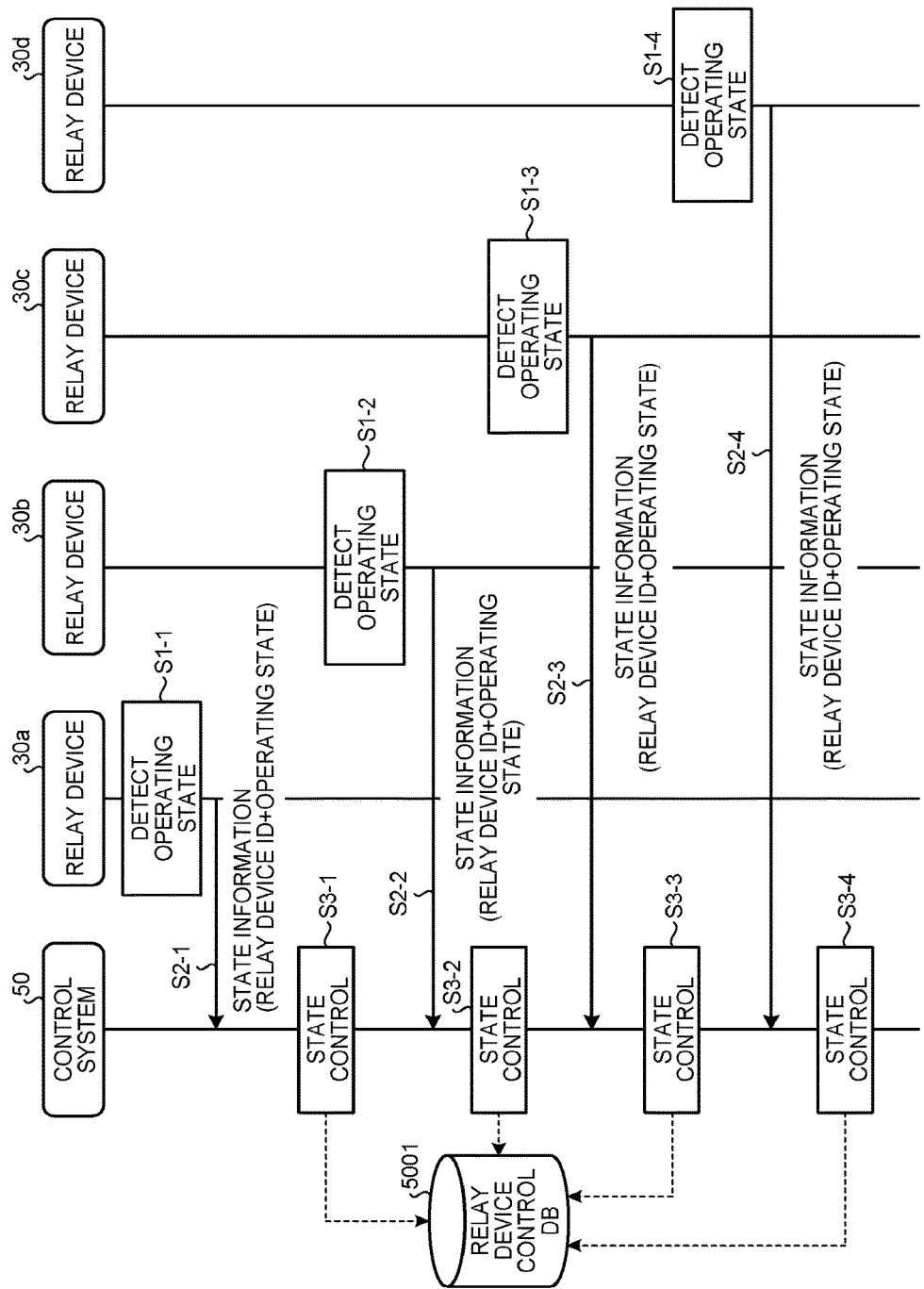
FIG. 19 is a sequence diagram illustrating a process for controlling state information that indicates an operating state of each relay device.
Figure 20:
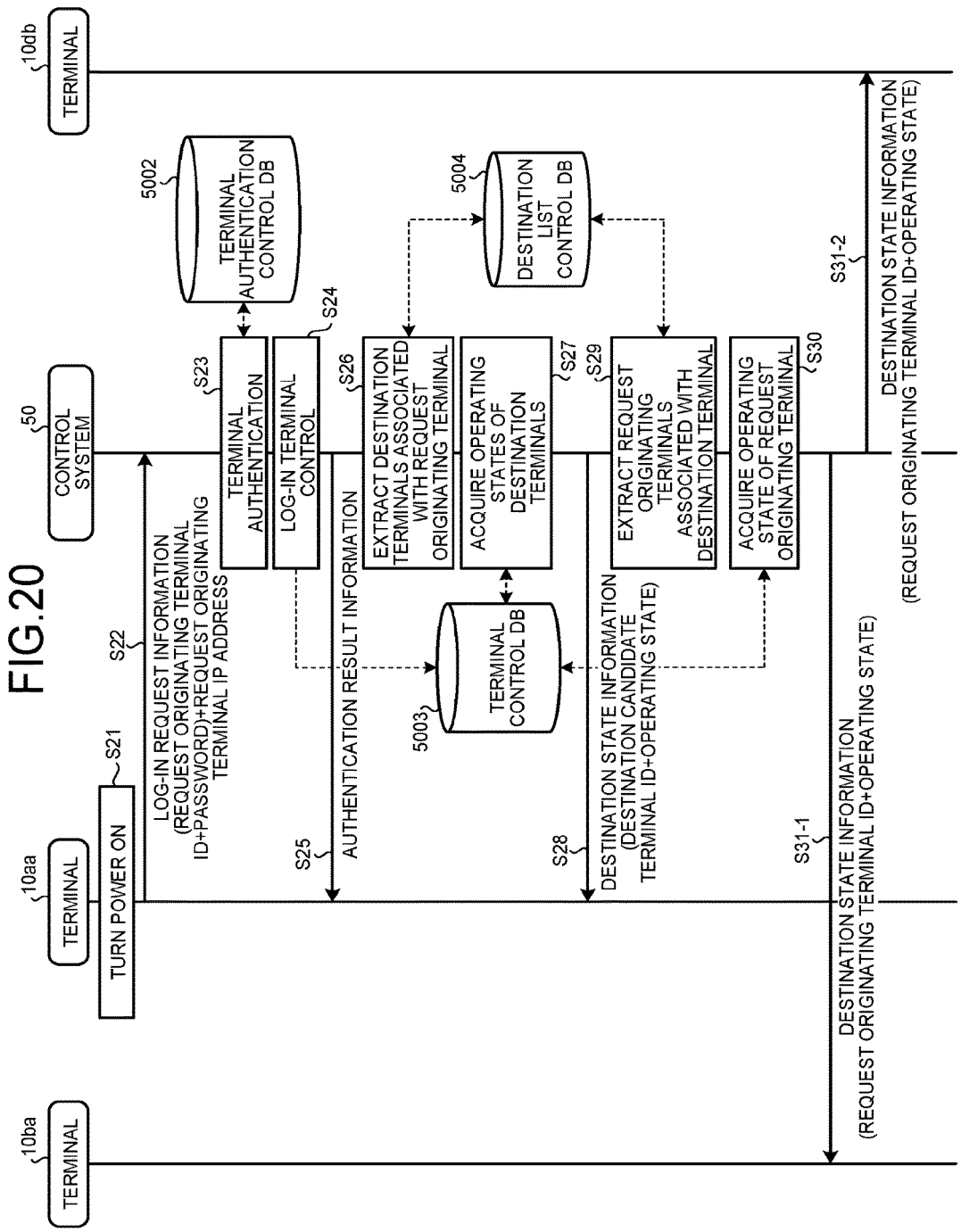
FIG. 20 is a sequence diagram illustrating a process for preparing for an initiation of remote communication among terminals.
Figure 21:
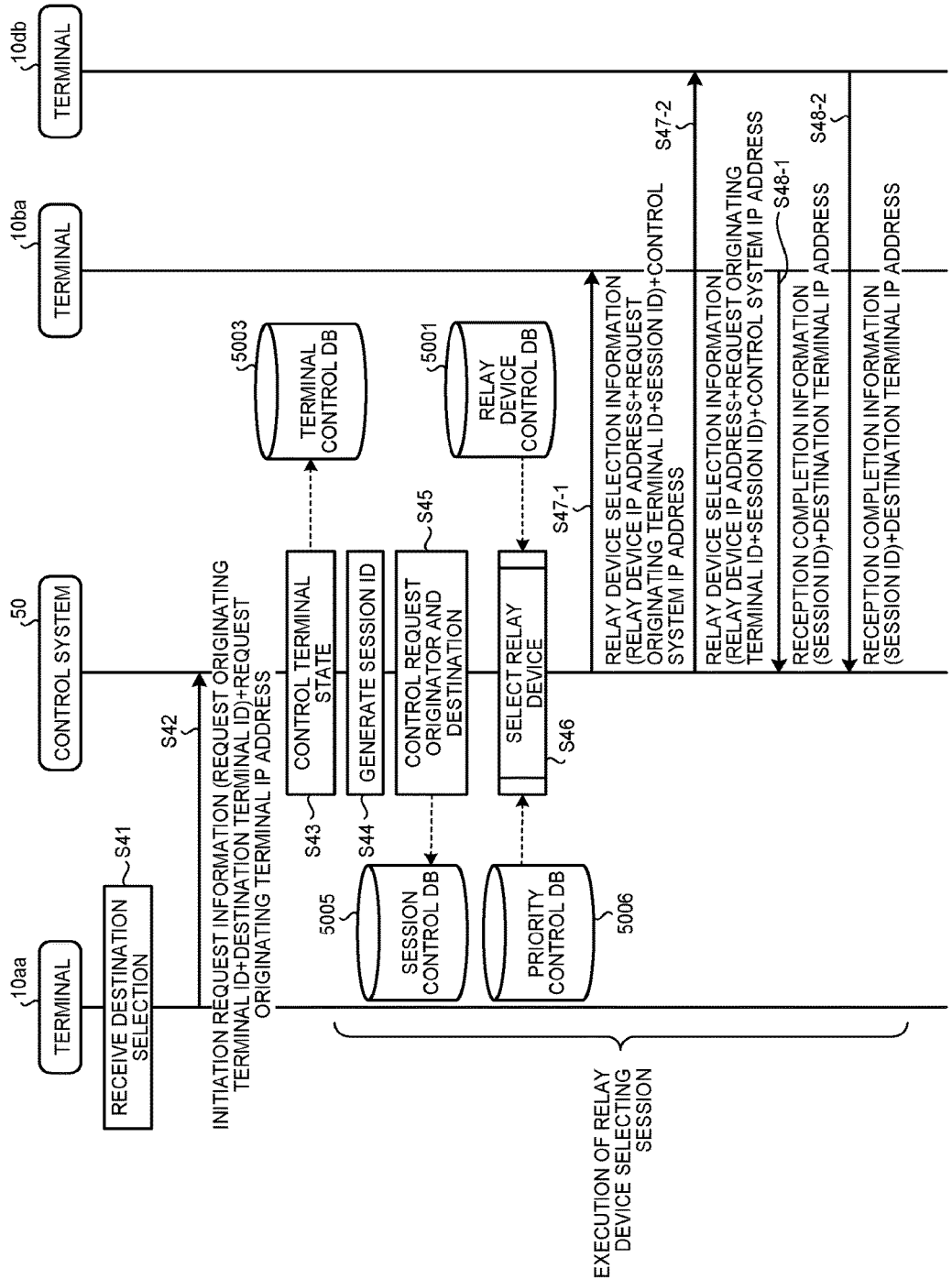
FIG. 21 is a sequence diagram illustrating a process for selecting a relay device.
Figure 22:
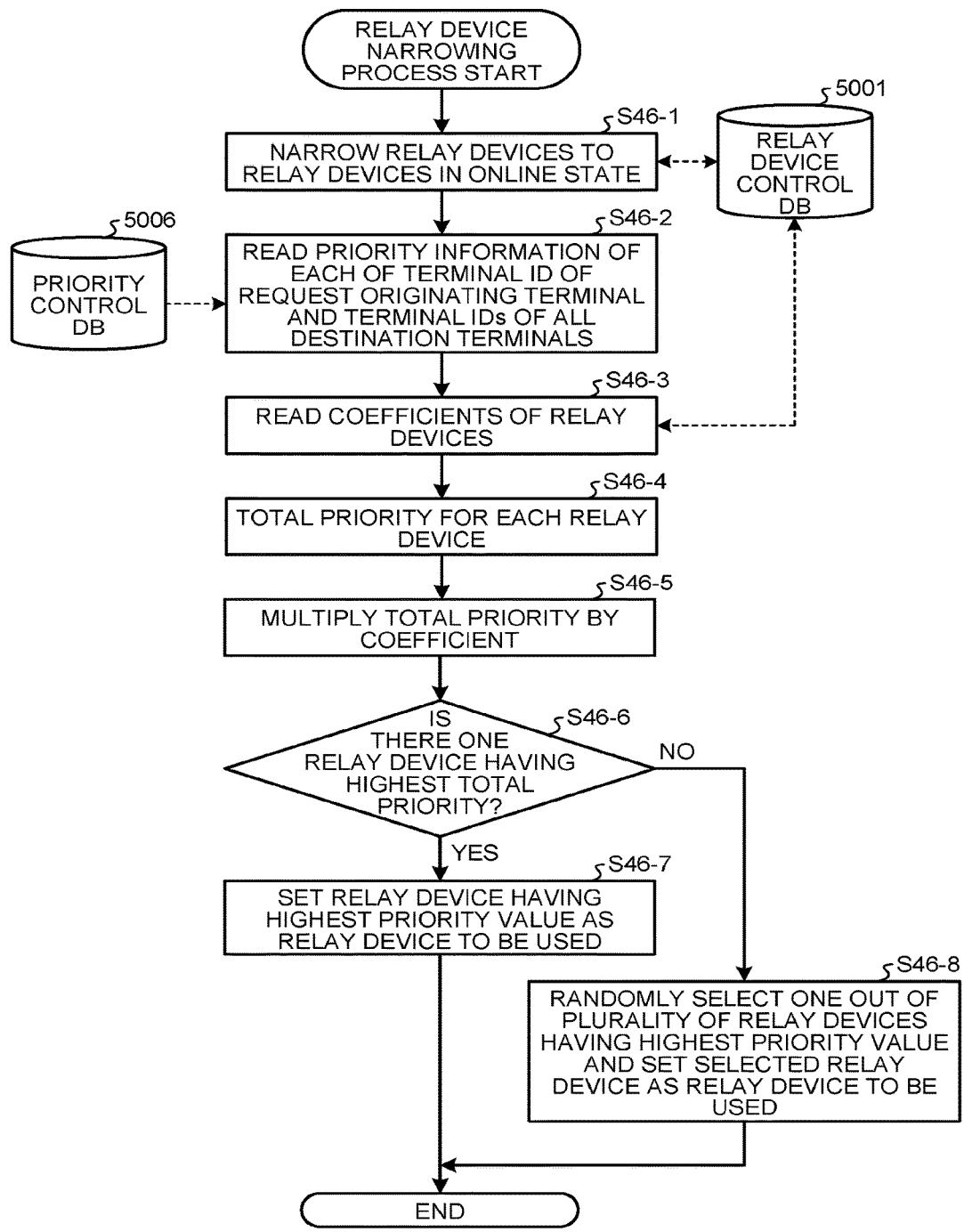
FIG. 22 is a flowchart illustrating a process for selecting the relay device.
Figure 23:
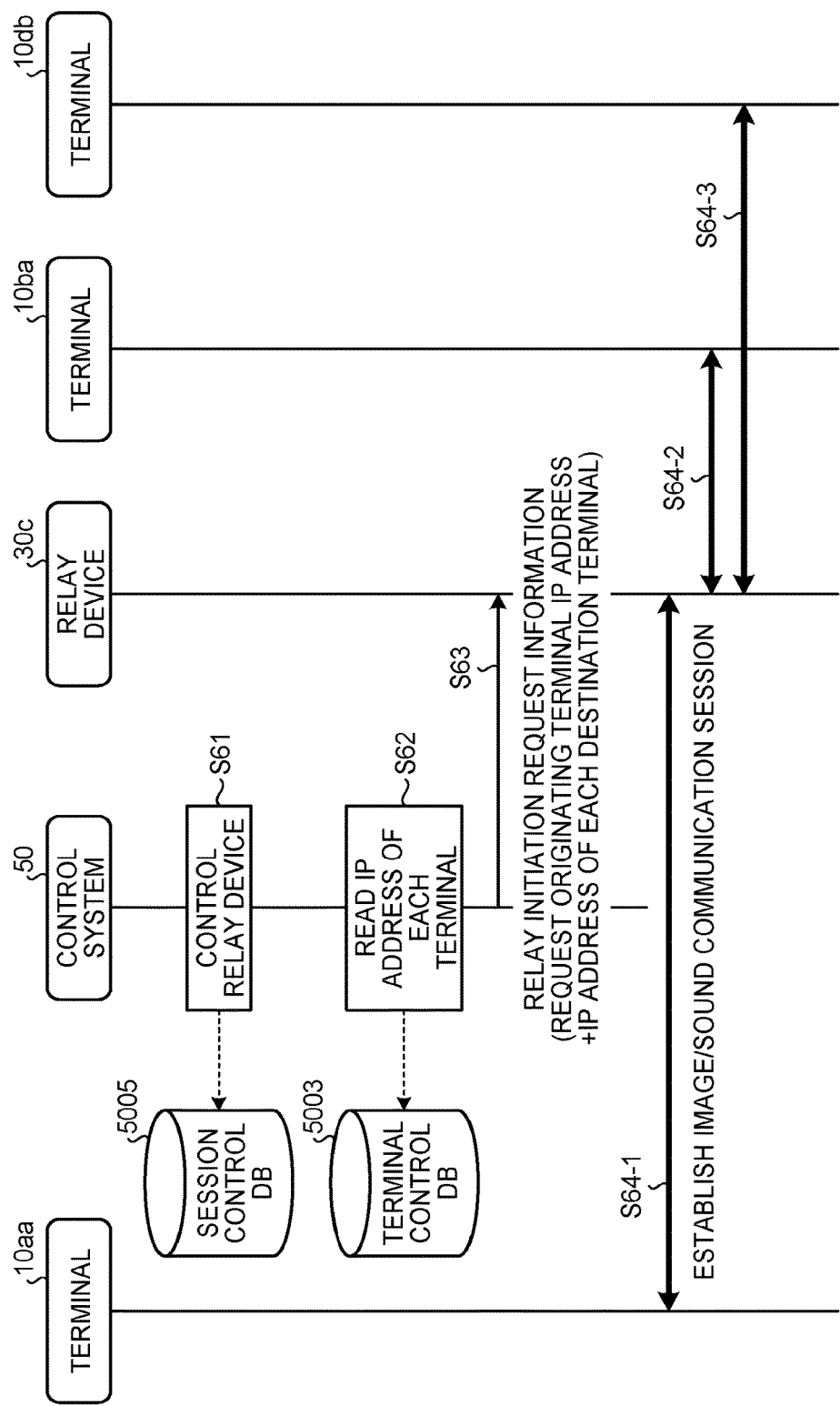
FIG. 23 is a sequence diagram illustrating a process for establishing a communication session.
Figure 24:
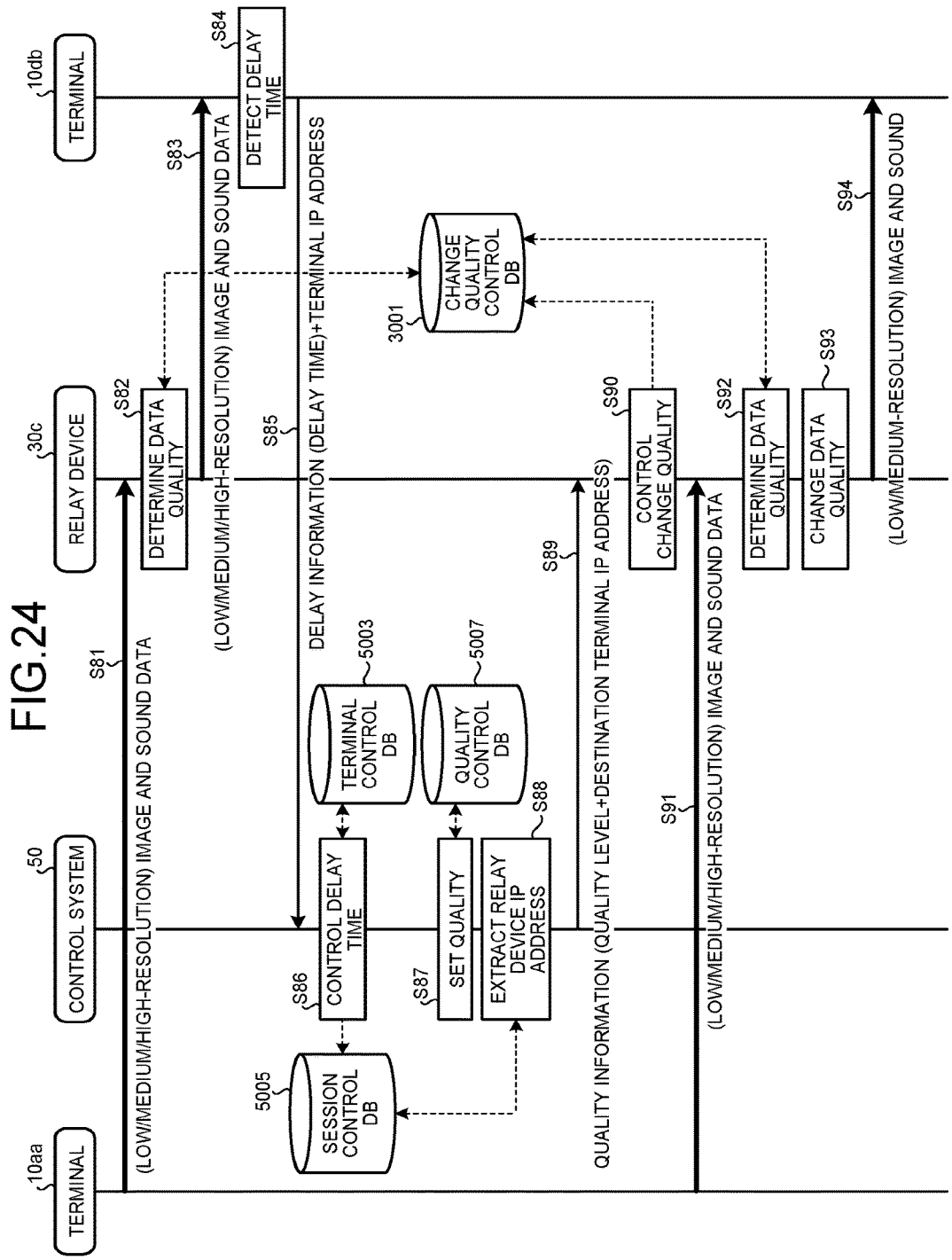
FIG. 24 is a sequence diagram illustrating a process for transmitting and receiving image data and sound data among the transmission terminals.

The following describes with reference to FIGS. 19 to 24 a processing method in the transmission system 1 according to the embodiment. FIG. 19 is a sequence diagram illustrating a process for controlling the state information that indicates the state of each relay device 30 and is transmitted from each relay device 30 to the control system 50. FIG. 20 is a sequence diagram illustrating a process for preparing for the initiation of calls among a plurality of terminals 10. FIG. 21 is a sequence diagram illustrating a process for narrowing the relay devices 30. FIG. 22 is a flowchart illustrating the process for narrowing the relay devices 30. FIG. 23 is a diagram illustrating a point calculation condition for the process for narrowing the relay devices 30. FIG. 24 is a sequence diagram illustrating a process for transmitting and receiving image data and sound data among the terminals.

The following describes, with reference to FIG. 19, the process for controlling the state information that indicates the state of each relay device 30 and is transmitted from each relay device 30 to the control system 50. In each relay device 30, the state detection unit 32 illustrated in FIG. 7 detects the operating state of the host relay device 30 at regular intervals (steps S1-1 to S1-4). To allow the control system 50 to control the operating state of each relay device 30 on a real-time basis, the transmission/reception unit 31 of each relay device 30 transmits each state information to the control system 50 via the communication network 2 at regular intervals (steps S2-1 to S2-4). The state information includes the relay device ID of each relay device 30 and the operating state of the relay device 30 detected by the state detection unit 32. The embodiment illustrates a case in which, while the relay devices (30a, 30b, and 30d) are operating properly in the "online" state, the relay device 30c is, though operating, in the "offline" state due to a fault in the program for executing a relay operation of the relay device 30c.

In the control system 50, the transmission/reception unit 51 receives the state information transmitted from each relay device 30 and stores the state information for each relay device ID in the relay device control DB 5001 (see FIG. 11) of the storage unit 5000 via the store/read processing unit 59 to thereby control the state information (steps S3-1 to S3-4). These steps allow the operating state of any of "online", "offline", and "faulty" to be stored and controlled by the relay device control table as illustrated in FIG. 11. At this time, the time and date when the control system 50 receives the state information is also stored and controlled for each relay device ID. When no state information is transmitted from the relay device 30, the operating state field and the time and date of reception field in each record in the relay device control table illustrated in FIG. 11 are blank or indicate the previous operating state and the previous time and date of reception, respectively.

The following describes with reference to FIG. 20 the process for transmitting and receiving each control information in a preparation stage prior to the initiation of calls among the terminal 10aa, the terminal 10ba, and the terminal 10db. In FIG. 20, all of the various types of control information are transmitted and received through the control information session sei illustrated in FIG. 2.

When the user turns on the power switch 109 illustrated in FIG. 5, the operation input reception unit 12 illustrated in FIG. 7 receives the input of turning on the power switch 109 and turns the power on (step S21). Upon the reception of the input of turning on the power switch 109, the log-in request unit 13 causes the transmission/reception unit 11 to automatically transmit via the communication network 2 the log-in request information that indicates a request for a log-in to the control system 50 (step S22). The log-in request information may be transmitted upon an operation of the operating button 108 by the user, instead of the turning-on of the power switch 109. The log-in request information includes the terminal ID and the password for identifying the host terminal 10aa as the request originator. The terminal ID and the password are read from the storage unit 1000 via the store/read processing unit 19 and transmitted to the transmission/reception unit 11. The terminal ID and the password may be data read from an identification information storage medium, such as a subscriber identity module (SIM) card connected to the terminal 10. When the terminal 10aa transmits the log-in request information to the control system 50, the control system 50 on the reception side can identify the IP address of the terminal 10ab on the transmission side.

The terminal authentication unit 52 of the control system 50 searches the authentication control DB 5002 (see FIG. 12) of the storage unit 5000 using as a search key the terminal ID and the password included in the log-in request information received via the transmission/reception unit 51 to thereby determine whether the authentication control DB 5002 controls a terminal ID and a password identical to the terminal ID and the password included in the log-in request information, thus performing the terminal authentication (step S23). When the terminal authentication unit 52 determines that the log-in request originates in the terminal 10 having valid use authority because the identical terminal ID and password are controlled, the state control unit 53 stores in the terminal control DB 5003 (see FIG. 13) the terminal ID of the terminal 10aa by associating the terminal ID with the operating state of the terminal 10aa, the time and date when the log-in request information is received, and the IP address of the terminal 10aa (step S24). This step results in the terminal control table illustrated in FIG. 13 that controls the terminal ID "01aa" associated with the operating state of "online", the time and date of reception of "2009.11.10.13: 40", and the IP address of the terminal 10aa of "1.2.1.3".

The transmission/reception unit 51 of the control system 50 transmits authentication result information that indicates an authentication result obtained by the terminal authentication unit 52 to the request originating terminal (the terminal 10aa) that has made the log-in request via the communication network 2 (step S25). In this embodiment, a case in which the terminal authentication unit 52 determines that the terminal has the valid use authority will further be described in the following.

The terminal extraction unit 54 of the control system 50 searches the destination list control DB 5004 (see FIG. 14) using the terminal ID "01aa" of the request originating terminal (terminal 10aa) as a search key and reads to extract the terminal IDs as the candidates for the destination terminals that can communicate with the request originating terminal (the terminal 10aa) (step S26). Here, the terminal IDs ("01ab", "01ba", and "01db") of the destination terminals (terminals 10ab, 10ba, and 10db), respectively, associated with the terminal ID "01aa" of the request originating terminal (terminal 10aa) are exemplarily extracted.

The terminal state acquisition unit 55 searches the terminal control DB 5003 (see FIG. 13) using as the search keys the terminal IDs ("01ab", "01ba", and "01db") of the destination terminal candidates extracted by the terminal extraction unit 54. The terminal state acquisition unit 55 thereby acquires the operating state of each of the terminals (10ab, 10ba, and 10db) by reading each of the operating states ("offline", "online", and "online") of the terminal IDs extracted by the terminal extraction unit 54 (step S27).

The transmission/reception unit 51 transmits destination state information to the request originating terminal (terminal 10aa) via the communication network 2 (step S28). The destination state information includes the terminal IDs ("01ab", "01ba", and "01db") used as the search keys at step S27 and the operating states ("offline", "online", and "online") of the respective terminals (10ab, 10ba, and 10db) associated with the terminal IDs. This step allows the request originating terminal (terminal 10aa) to identify the current operating states ("offline", "online", and "online") of the terminals (10ab, 10ba, and 10db) as the candidates for the destination terminals that can communicate with the request originating terminal (terminal 10aa).

The terminal extraction unit 54 of the control system 50 searches the destination list control DB 5004 (see FIG. 14) using the terminal ID "01aa" of the request originating terminal that has made the log-in request (terminal 10aa) as the search key and extracts terminal IDs of other request originating terminals that have the terminal ID "01aa" of the above-mentioned request originating terminal (terminal 10aa) registered as a destination terminal candidate (step S29). The destination list control table illustrated in FIG. 14 indicates that the terminal IDs of other request originating terminals to be extracted are "01ab", "01ba", and "01db".

The terminal state acquisition unit 55 of the control system 50 searches the terminal control DB 5003 (see FIG. 13) using as the search key the terminal ID ("01aa") of the request originating terminal (terminal 10aa) that has made the log-in request, to thereby acquire the operating state of the request originating terminal (terminal 10aa) that has made the log-in request (step S30).

The transmission/reception unit 51 transmits the destination state information that includes the terminal ID ("01aa") and the operating state "online" of the request originating terminal (terminal 10aa) acquired at step S30 to the terminals (10ba and 10db) having the operating state of "online" indicated in the terminal control DB 5003 (see FIG. 13) out of the terminals (10ab, 10ba, and 10db) relating to the terminal IDs ("01ab", "01ba", and "01db") extracted at step S29 (steps S31-1 and S31-2). When transmitting the destination state information to the terminals (10ba and 10db), the transmission/reception unit 51 refers to the IP addresses of the terminals controlled by the terminal control table illustrated in FIG. 13 using the respective terminal IDs ("01ba" and "01db"). This step allows each of the other destination terminals (terminals 10ba and 10db) that can perform communication with the request originating terminal (terminal 10aa) that has made the log-in request as their destinations to be notified of the terminal ID "01aa" and the operating state "online" of the request originating terminal (terminal 10aa) that has made the log-in request.

With other terminals 10, too, when the user turns on the power switch 109 illustrated in FIG. 6, the operation input reception unit 12 illustrated in FIG. 7 receives the input of turning on the power switch 109 as described earlier with reference to step S21 and the same process from steps S22 to S31-1 and S31-2 are performed. Descriptions therefor will thus be omitted.

The following describes with reference to FIG. 21 the process for selecting the relay device 30. In FIG. 21, all of the various types of control information are transmitted and received through the control information session sei illustrated in FIG. 21. In the embodiment, the request originating terminal (terminal 10aa) can make a call to, out of the terminals 10 as the destination candidates, at least one of the terminals (10ba and 10db) in the online operating state on the basis of the terminal state information received at step S28. The following describes a case in which the user of the request originating terminal (terminal 10aa) selects to initiate calls among three bases including the destination terminal (terminal 10ba) and the destination terminal (terminal 10db).

When the user presses the operating button 108 illustrated in FIG. 5 and selects the terminal 10db, the operation input reception unit 12 illustrated in FIG. 7 receives the request for initiating the calls to the destination terminals (terminal 10ba and terminal 10db) (step S41). The transmission/reception unit 11 of the request originating terminal (terminal 10aa) transmits to the control system 50 initiation request information that includes the terminal ID "01aa" of the terminal 10aa and the terminal IDs ("01ba" and "01db") of the destination terminals (terminal 10ba and terminal 10db) and indicates an intent to initiate the calls (step S42). This step allows the transmission/reception unit 51 of the control system 50 to receive the initiation request information and to acquire the IP address "1.2.1.3" of the request originating terminal (terminal 10aa) on the transmitting side.

On the basis of the terminal ID "01aa" of the request originating terminal (terminal 10aa) and the terminal IDs ("01ba" and "01db") of the destination terminals (terminal 10ba and terminal 10db) included in the initiation request information, the state control unit 53 changes, in the terminal control table (see FIG. 13), the operating state fields of the records that include the terminal ID "01aa", the terminal ID "01ba", and the terminal ID "01db", respectively, to "in call" (step S43). With this change, the request originating terminal (terminal 10aa), the destination terminal (terminal 10ba), and the destination terminal (terminal 10db) are in an in-call state, although the calls are yet to be initiated. Thus, when another terminal 10 attempts to make a call to the request originating terminal (terminal 10aa), the destination terminal (terminal 10ba), or the destination terminal (terminal 10db), a notification sound or display indicating the in-call state is output.

The following describes a process for executing a session for selecting the relay device 30 to be actually used. The session ID generation unit 56a illustrated in FIG. 8 generates the selecting session ID to be used for the execution of the session for selecting the relay device (step S44). Here, a selecting session ID "se1" is generated.

The session control unit 57 stores in the storage unit 5000 to control, as the record in the first row in the session control table (see FIG. 15), the selecting session ID "se1" generated at step S44 by associating the selecting session ID "se1" with the terminal ID "01aa" of the request originating terminal (terminal 10aa) and the terminal ID "01ba" of the destination terminal (terminal 10ba). The session control unit 57 further stores in the storage unit 5000 to control, as the record in the second row in the session control table (see FIG. 15), the selecting session ID "se1" generated at step S44 by associating the selecting session ID "se1" with the terminal ID "01aa" of the request originating terminal (terminal 10aa) and the terminal ID "01db" of the destination terminal (terminal 10db) (step S45).

The selection unit 56 illustrated in FIG. 8 of the control system 50 then selects the relay device 30 for relaying the calls among the three bases of the request originating terminal (terminal 10aa), the destination terminal (terminal 10ba), and the destination terminal (terminal 10db) using the relay device control DB 5001 and the priority control DB 5006 (step S46).

The following describes the process at step S46 in detail with reference to FIGS. 7 and 22. The store/read processing unit 59 illustrated in FIG. 7 narrows the relay device IDs controlled by the relay device control table (see FIG. 11) to only those relay device IDs in the online operating state (step S46-1). In FIG. 11, only the relay device ID "111b" is in the offline operating state, and the relay device 30b identified by the relay device ID "111b" is excluded from possible relay devices to be selected.

The store/read processing unit 59 next reads priority information that indicates the terminal ID of the request originating terminal and the priority of each of all destination terminals from the priority control table see FIG. 16) (step S46-2). Here, the priority information of each of all relay terminal IDs but the relay device ID "111b" is read.

The store/read processing unit 59 then searches the relay device control table (see FIG. 11) using all relay terminal IDs but the relay device ID "111b" as the search keys, thereby reading respective coefficients (step S46-3).

The calculation unit 56b of the selection unit 56 totals priorities of each relay device 30 excluding the relay device 30b to thereby derive the total priority (step S46-4). When, for example, the request originating terminal is the terminal 10aa (terminal ID "01aa") and the destination terminals are the terminal 10ba (terminal ID "01ba") and the terminal 10db (terminal ID "01db"), the total priority of the relay device 30a (relay device ID "111a") is 230 (=100+80+50) in FIG. 16.

The calculation unit 56b next multiplies the total priority of each relay device 30 by the corresponding coefficient of the relay device control table (see FIG. 11) to thereby find the final total priority value (step S46-5).

The determination unit 56c of the selection unit 56 determines whether there is one relay device ID having the highest final total priority value (step S65-6). In the example illustrated in FIG. 16, the final total priority in the relay device ID "111a" is 207 (=203×0.9), the final total priority in the relay device ID "111c" is 213.4 (=220×0.97), and the final total priority in the relay device ID "111d" is 192 (=240×0.8). Thus, the determination unit 16b determines that the relay device ID having the highest final total priority value is "111c" only.

If it is determined at step S46-6 that there is only one relay device ID (Yes), the set unit 16c sets the relay device identified by the relay device ID having the highest final total priority value as the relay device to be actually used (step S46-7). In the example illustrated in FIGS. 10 and 11, the relay device 30c identified by the relay device ID "111c" is set.

If it is determined at step S46-6 that there is not only one relay device ID (No), the set unit 16c randomly selects one relay device ID out of a plurality of relay device IDs having the highest final total priority value and sets the relay device identified by the selected relay device ID as the relay device to be actually used (step S46-8).

When the foregoing process for selecting the relay device at step S46 is completed, the transmission/reception unit 51 illustrated in FIG. 7 transmits relay device selection information to the destination terminal (terminal 10ba) via the communication network 2 (step S47-1). The relay device selection information includes the IP address of the relay device 30c selected at step S46, the terminal ID "01aa" of the request originating terminal (terminal 10aa), and the selecting session ID "se1" generated at step S44. The relay device selection information allows the destination terminal (terminal 10ba) to acquire the IP address of the control system 50 that is the transmission side of the relay device selection information in the execution of the session using the selecting session ID "se1". The control system 50 also transmits similar relay device selection information to the other destination terminal (terminal 10db) (step S47-2). In this case, too, the destination terminal (terminal 10db) can acquire the IP address of the control system 50 as the transmission side of the relay device selection information in the execution of the session using the selecting session ID "se1".

In response to the operation at step S47-1, the destination terminal (terminal 10ba) causes the transmission/reception unit 11 to transmit to the control system 50 via the communication network 2 reception completion information that indicates that the reception of the relay device selection information is completed through the operation at step S47-1 (step S48-1). The reception completion information includes the session ID transmitted and received through the operation at step S47-1. The reception completion information allows the control system 50 to determine that transmission of the relay device selection information executed using the specific selecting session ID "se1" is completed and to acquire the IP address of the destination terminal (terminal 10ba) on the transmission side. Similarly, in response to the operation at step S47-2, the destination terminal (terminal 10db) transmits to the control system 50 the reception completion information that indicates that the reception of the relay device selection information is completed through the operation at step S47-2 (step S48-2). In this case, too, the control system 50 determines that the transmission of the relay device selection information executed using the specific selecting session ID "se1" is completed and acquires the IP address of the destination terminal (terminal 10db) on the transmission side.

The session control unit 57 of the control system 50 stores, in the relay device ID fields of the records in which the selecting session ID is included in the session control table (see FIG. 15), the relay device ID of the finally selected relay device 30c (step S61) and controls the relay device ID. In the example illustrated in FIG. 15, the relay device ID "111c" is stored and controlled in the relay device fields of the first and second row records.

The store/read processing unit 59 of the control system 50 then searches the terminal control table (see FIG. 13) using the terminal IDs of the request originating terminal (terminal 10aa), the destination terminal (terminal 10ba), and the destination terminal (terminal 10db) received through the operation at step S42, to thereby read the respective IP addresses (step S62).

The transmission/reception unit 51 of the control system 50 transmits to the selected relay device 30 relay initiation request information that indicates a request for initiating relay (step S63). The relay initiation request information includes the IP addresses read through the operation at step S62. In the example illustrated in FIG. 16, the relay initiation request information is transmitted to the relay device 30c. The transmission of the relay initiation request information allows the relay device 30c to determine that the host relay device 30c has been selected, so that the relay device 30c establishes a session communicating three types of image data of the low-resolution image data, the medium-resolution image data, and the high-resolution image data and sound data among the terminals (10aa, 10ba, and 10db) (steps S64-1, S64-2, and S64-3). The terminals (10aa, 10ba, and 10db) can thereby initiate television conference communications at the three bases.

From the foregoing, despite the communications performed among the three bases of the terminal 10aa in zone A, the terminal 10ba in zone B, and the terminal 10db in zone C, consideration of a balance in transmission rates for content data under the environment of the communication network 2 results in the use of the relay device 30c in zone C.

The following describes with reference to FIGS. 7 and 24 a process for transmitting and receiving image data and sound data in order to perform television conference communications between, for convenience sake, the request originating terminal (terminal 10aa) and the destination terminal (terminal 10db) among the terminals (10aa, 10ba, and 10db). For example, the transmission and reception of image data and sound data and detection of delay time to be described later are identical to each other between a process for transmitting the image data and sound data in a first direction from the terminal 10aa to the terminal 10db and a process for transmitting the image data and sound data in a direction from the terminal 10db to the terminal 10aa, which is opposite to the first direction. Thus, the following describes the communication in the first direction and the communication in the opposite direction will be omitted in the description.

The request originating terminal (terminal 10aa) causes the transmission/reception unit 11 to transmit the image data of an object captured by the image capturing unit 14a and the sound data of voice input at the sound input unit 15a to the relay device 30c via the communication network 2 through the image/sound data session sed illustrated in FIG. 2 (step S81). In the embodiment, the image data having high image quality and including the low-resolution image data, the medium-resolution image data, and the high-resolution image data illustrated in FIG. 3 and the sound data are transmitted. The relay device 30c thus receives the image data having the abovementioned three resolutions and the sound data at the transmission/reception unit 31. The data quality determination unit 33 searches the change quality control DB 3001 (see FIG. 9) using the IP address "1.3.2.4" of the destination terminal (terminal 10db) as the search key to thereby extract the corresponding image quality of the image data to be relayed. The quality of the image of the image data to be relayed is thus determined (step S82). In this embodiment, because the image quality thus determined of the image data is the "high image quality" and is the same as that received by the transmission/reception unit 31, the relay device 30c transfers the image data having the image quality as is and the sound data having the sound quality as is to the destination terminal (terminal 10db) using the image/sound data session sed (step S83). As a result, the destination terminal (terminal 10db) receives at the transmission/reception unit 11 the image data having high image quality and including the low-resolution image data, the medium-resolution image data, and the high-resolution image data and the sound data. The display control unit 17 can then display an image on the display 120 by combining the image data having the three image qualities, and the sound output unit 15b can output voice based on the sound data.

The delay detection unit 18 of the terminal 10db detects at predetermined time intervals (e.g., every 1 second) the delay time in reception of the image data by the transmission/reception unit 11 (step S84). The following describes a case in the embodiment in which the delay time is 200 (ms).

The transmission/reception unit 11 of the destination terminal (terminal 10db) transmits delay information that indicates the delay time of "200 (ms)" to the control system 50 via the communication network 2 through the control information session sei illustrated in FIG. 2 (step S85). The transmission of the delay information allows the control system 50 to determine the delay time and to identify the IP address "1.3.2.4" of the terminal 10db as the transmission end of the delay information.

The delay time control unit 60 of the control system 50 searches the terminal control DB 5003 (see FIG. 13) using the IP address "1.3.2.4" of the destination terminal (terminal 10db) as the search key to thereby extract the corresponding terminal ID "01db". Then, the delay time control unit 60 stores to control in the delay time field in the record of the terminal ID "01db" in the session control table of the session control DB 5005 (see FIG. 15) the delay time "200 (ms)" indicated in the delay information (step S86).

The quality determination unit 58 searches the quality control DB 5007 (see FIG. 18) using the delay time "200 (ms)" as the search key and extracts the corresponding "medium image quality" for the image quality of the image data to thereby set the "medium image quality" (step S87).

The transmission/reception unit 51 then searches the relay device control DB 5001 (see FIG. 11) using the relay device ID "111c" associated with the terminal ID "01db" in the session control table of the session control DB (see FIG. 15), and extracts the IP address "1.3.1.2" of the corresponding relay device 30c (step S88). The transmission/reception unit 51 then transmits, through the control information session sei illustrated in FIG. 2, the quality information indicating the "medium image quality" set at step S87 for the image quality of the image data to the relay device 30c via the communication network 2 (step S89). The quality information includes the IP address "1.3.2.4" of the destination terminal (terminal 10db) used as the search key at step S86. The transmission of the quality information allows the relay device 30c to cause the change quality control unit 34 to store to control in the change quality control DB 3001 (see FIG. 9) the "medium image quality" for the image quality of the image data to be relayed, associated with the IP address "1.3.2.4" of the terminal 10 on the transmission end (in this case, the terminal 10db) (step S90).

As at step S81 described above, the terminal 10aa transmits the image data having high image quality and including the low-resolution image data, the medium-resolution image data, and the high-resolution image data and the sound data to the relay device 30c through the image/sound data session sed (step S91). Then in the relay device 30c, as at step S82 described above, the data quality determination unit 33 searches the change quality control DB 3001 (see FIG. 9) using the IP address "1.3.2.4" of the destination terminal (terminal 10db) as the search key to thereby extract the corresponding "medium image quality" for the image quality of the image data to be relayed. The quality of the image of the image data to be relayed is thereby determined (step S92). In the embodiment, because the determined image quality of the image data is the "medium image quality" that is lower than the "high image quality" of the image data received by the transmission/reception unit 31, the data quality change unit 35 degrades the image quality of the image data from the "high image quality" to the "medium image quality" to thereby change the quality of the image of the image data (step S93).

The transmission/reception unit 31 transmits, through the image/sound data session sed, the image data having its image quality changed to the "medium image quality" and the sound data having its sound quality not changed to the terminal 10db via the communication network 2 (step S94). As a result, the destination terminal (terminal 10db) receives at the transmission/reception unit 11 the image data having the medium image quality and including the low-resolution image data and the medium-resolution image data, and the sound data. The display control unit 17 can then display an image on the display 120 by combining the image data having the two image qualities and the sound output unit 15b can output voice based on the sound data.

When the delay in reception occurs in the destination terminal (terminal 10db) that receives the image data as described above, the relay device 30c changes the quality of the image to thereby be able not to give awkward feelings to attendees at the television conference.

Main Effect of Embodiment

As described above, the embodiment achieves an effect of enabling each terminal 10 to transmit and receive high-quality content data well-balanced under the actual communication network environment, because the control system 50 selects the relay device 30 on the basis of not only priorities of a plurality of relay devices in the request originating terminal (terminal 10aa), but also priorities of a plurality of relay devices in each destination terminal (terminal 10ba and terminal 10db).

Second Embodiment

The following describes a second embodiment of the present invention with reference to FIG. 25. FIG. 27 is a conceptual diagram illustrating a coefficient table used for calculation of priorities according to the second embodiment of the present invention. FIG. 25 represents another example of the coefficient table for the calculation of the priorities illustrated in FIG. 10 for the first embodiment.

As illustrated in FIG. 25, a new item of relative importance is added for varying the degree of each index in the coefficient table illustrated in FIG. 10. To elaborate on FIG. 25, the relay device 30c having the relay device ID "111c", for example, is rated as "3" in terms of relative importance, though having a reliability priority of "0.9", so that its priority is 2.7 (=0.9×3).

As described above, having the relative importance in the index achieves an effect of being capable of selecting the relay device 30 more conforming to actual communication conditions.

Supplement to Embodiments

The relay device 30, the control system 50, the program providing system 90, and the maintenance system 100 in the above-described embodiment may be implemented by a single computer, or may be implemented by a plurality of computers to which units (functions or modules) are divided and arbitrarily allocated. Additionally, when the program providing system 90 is implemented by a single computer, the program transmitted by the program providing system 90 may be transmitted in divided parts, each containing a plurality of modules, or may be transmitted in a lump. When the program providing system 90 is implemented by a plurality of computers, the program may be transmitted from each computer that transmits its divided part of the modules.

The recording medium, such as a CD-ROM, in which the terminal program, the relay device program, or the transmission control program in each of the above-described embodiments is stored, the HD 204 that stores therein these programs, and the program providing system 90 including the HD 204 are each used as a program product when the terminal program, the relay device program, and the transmission control program are provided for, for example, users in domestic and foreign markets.

In the above-described embodiment, focus is placed, in the change quality control table illustrated in FIG. 9 and the quality control table illustrated in FIG. 18, on the resolution of the image of the image data as an exemplary quality of the image of the image data relayed by the relay device 30. This is, however, not the only possible arrangement. Alternatively, focus may be placed on other qualities including: depth of the image quality of the image data; sampling frequency in voice of the sound data; and a bit length in voice of the sound data. Still alternatively, the sound data may be transmitted and received in three divided parts of data in terms of resolution (high resolution, medium resolution, and low resolution).

In FIGS. 11, 13, and 15, the time and date of reception is controlled. Nonetheless, at least the time of reception is required to be controlled out of the time and date of reception.

Additionally, in the above-described embodiment, the IP address of the relay device is controlled in FIG. 11 and the IP address of the terminal is controlled in FIG. 13. Nonetheless, a fully qualified domain name (FQDN) of the relay device 30 or of the terminal 10 may be controlled, if the FQDN serves as relay device identification information for identifying a specific relay device 30 on the communication network 2 or as terminal identification information for identifying a specific terminal 10 on the communication network 2. In this case, an IP address corresponding to the FQDN is acquired by a well-known domain name system (DNS) server. The expression of "relay device identification information for identifying a specific relay device 30 on the communication network 2" may be elaborated by the expression of "relay device connection destination information that indicates a connection destination to the relay device 30 on the communication network 2" or "relay device destination information that indicates a destination to the relay device 30 on the communication network 2". Similarly, the expression of "terminal identification information for identifying a specific terminal 10 on the communication network 2" may be elaborated by the expression of "terminal connection destination information that indicates a connection destination to the terminal 10 on the communication network 2" or "terminal destination information that indicates a destination to the terminal 10 on the communication network 2".

The case of a television conference terminal has been described as an example of the transmission terminal in the above-described embodiment, the invention should not be construed to be limited to the embodiment. An internet telephone or telephone system, for example, an internet protocol (IP) telephone, may be within a scope of the invention. Alternatively, the transmission terminal may be a smartphone, a cellular phone, a vehicle navigation terminal, a wearable computer, a monitoring camera, an electronic whiteboard, a projector, a gaming machine, or industrial equipment having a communication function. The wearable computer includes a wristwatch and a head mount display. The industrial equipment includes office equipment such as a multifunction peripheral/printer/product (MFP), medical equipment such as an endoscope, and agricultural equipment such as a cultivator.

The case of the image data and the sound data has been described as an example of the content data in the above-described embodiment, but the invention should not be construed to be limited to the embodiment. The content data may be tactile (touch) data, in which case tactile sensation a user feels on a first terminal side is transmitted to a second terminal side. The content data may even be olfactory (smell) data, in which case a smell on a first terminal side is transmitted to a second terminal side. Alternatively, the content data may be at least one type of data out of the image data, the sound data, the tactile data, and the olfactory data.

The above-described embodiment has been described for a case in which a television conference is conducted by the transmission system 1, but the invention should not be construed to be limited to the embodiment. The transmission system 1 may be used for a meeting, a general conversion among family members and friends, or for presentation of information in one direction.

In an embodiment, a relay device is selected according to the priorities of the relay devices in the destination terminal, in addition to the priorities of the relay devices in the first transmission terminal that requests the initiation of communication. Each transmission terminal is thus able to transmit and receive the high-quality content data well balanced under an actual communication network environment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST 1 transmission system
10 transmission terminal
11 transmission/reception unit
17 display control unit
18 delay detection unit
30 relay device
31 transmission/reception unit
32 state detection unit
33 data quality determination unit
34 change quality control unit
35 data quality change unit
50 transmission control system
51 transmission/reception unit
52 terminal authentication unit
53 state control unit
54 terminal extraction unit
55 terminal state acquisition unit
56 selection unit (exemplary selection means)
56a session ID generation unit
56b calculation unit (exemplary calculation means)
56c determination unit (exemplary determination means)
56d set unit (exemplary set means)
57 session control unit
58 quality determination unit
60 delay time control unit
70 router
90 program providing system
100 maintenance system
1000 storage
3000 storage
3001 change quality control DB
5000 storage (exemplary storage)
5001 relay device control DB
5002 authentication control DB
5003 terminal control DB
5004 destination list control DB
5005 session control DB
5006 priority control DB
5007 quality control DB

What is claimed is:

1. A transmission control system that controls a plurality of transmission terminals, each of the transmission terminals transmitting and receiving content data via a certain relay device, the transmission control system comprising:
   a memory that stores therein zone identification information for identifying a zone in which each of the transmission terminals is used, and priority information that indicates a priority at which a transmission terminal indicated by the zone identification information should use each of a plurality of relay devices, in association with each other;
   a communication interface that receives, from a first transmission terminal that requests initiation of communication with a transmission terminal as a destination terminal, first zone identification information for identifying a zone in which the first transmission terminal is used and second zone identification information for identifying a zone in which a second transmission terminal as the destination terminal is used; and
   processing circuitry configured to select a single relay device to be used for relaying the content data based on first priority information associated with the first zone identification information in the memory and second priority information associated with the second zone identification information in the memory,
   wherein the priority information indicates relay device identification information for identifying each of the relay devices and a priority of use of corresponding one of the relay devices in association with each other, the priority included in the priority information indicating a value calculated based on a round trip time between a relay device in a first zone in which a respective transmission terminal is used, and a relay device corresponding to another zone different from the first zone, and the processing circuitry totals priorities in the first priority information and the second priority information to thereby derive a total priority for each piece of the relay device identification information that includes a combination of separate priorities for both the first transmission terminal and the second transmission terminal; and set, out of the pieces of the relay device identification information, a piece of the relay device identification information corresponding to a maximum total priority among the total priorities, as the relay device to be selected.

2. The transmission control system according to claim 1, wherein the zone identification information is each included in terminal identification information for identifying each of the transmission terminals, and the memory stores therein the terminal identification information and the priority information in association with each other.

3. The transmission control system according to claim 1, wherein the processing circuitry multiplies each of the total priorities by a certain coefficient for each of the total priorities, and sets, out of the pieces of the relay device identification information, a piece of the relay device identification information corresponding to a maximum total priority among the total priorities after the multiplication by the certain coefficients.

4. The transmission control system according to claim 3, wherein the processing circuitry determines whether, out of the total priorities after the multiplication by the certain coefficients, the maximum total priority is only one, and when the processing circuitry determines that the maximum total priority is not only one, sets a piece of the relay device identification information corresponding to a random total priority among the maximum total priorities.

5. The transmission control system according to claim 3, wherein the certain coefficient is set based on at least one of a running cost of each of the relay devices, reliability of each of the relay devices, and a scale of each of the relay devices.

6. The transmission control system according to claim 1, wherein the transmission terminal is a television conference terminal, a smartphone, a cellular phone, a vehicle navigation terminal, a wearable computer, or a gaming machine.

7. A transmission system comprising:
the transmission control system according to claim 1; and
the relay devices.

8. A maintenance system performing maintenance of the transmission control system according to claim 1.

9. A selecting method performed by a transmission control system that controls a plurality of transmission terminals, each of the transmission terminals transmitting and receiving content data via a certain relay device, the transmission control system including a memory that stores therein zone identification information for identifying a zone in which each of the transmission terminals is used, and priority information that indicates a priority at which a transmission terminal indicated by the zone identification information should use each of a plurality of relay devices, in association with each other, the method comprising:

receiving, from a first transmission terminal that requests initiation of communication with a transmission terminal as a destination terminal, first zone identification information for identifying a zone in which the first transmission terminal is used and second zone identification information for identifying a zone in which a second transmission terminal as the destination terminal is used; and selecting a single relay device to be used for relaying the content data based on first priority information associated with the first zone identification information in the memory and second priority information associated with the second zone identification information in the memory, wherein the priority information indicates relay device identification information for identifying each of the relay devices and a priority of use of corresponding one of the relay devices in association with each other, the priority included in the priority information indicating a value calculated based on a round trip time between a relay device in a first zone in which a respective transmission terminal is used, and a relay device corresponding to another zone different from the first zone, and the method further includes totaling priorities in the first priority information and the second priority information to thereby derive a total priority for each piece of the relay device identification information that includes a combination of separate priorities for both the first transmission terminal and the second transmission terminal; and setting, out of the pieces of the relay device identification information, a piece of the relay device identification information corresponding to a maximum total priority among the total priorities, as the relay device to be selected.

10. A computer program product comprising a non-transitory computer-readable medium containing an information processing program, the program, when executed by processing circuitry, causing a transmission control system, that controls a plurality of transmission terminals, each of the transmission terminals transmitting and receiving content data via a certain relay device, the transmission control system including a memory that stores therein zone identification information for identifying a zone in which each of the transmission terminals is used, and priority information that indicates a priority at which a transmission terminal indicated by the zone identification information should use each of a plurality of relay devices, in association with each other, to perform the method comprising:

receiving, from a first transmission terminal that requests initiation of communication with a transmission terminal as a destination terminal, first zone identification information for identifying a zone in which the first transmission terminal is used and second zone identification information for identifying a zone in which a second transmission terminal as the destination terminal is used; and selecting a single relay device to be used for relaying the content data based on first priority information associated with the first zone identification information in the memory and second priority information associated with the second zone identification information in the memory, wherein the priority information indicates relay device identification information for identifying each of the relay devices and a priority of use of corresponding one of the relay devices in association with each other, the priority included in the priority information indicating a value calculated based on a round trip time between a relay device in a first zone in which a respective transmission terminal is used, and a relay device corresponding to another zone different from the first zone, and the method further includes totaling priorities in the first priority information and the second priority information to thereby derive a total priority for each piece of the relay device identification information that includes a combination of separate priorities for both the first transmission terminal and the second transmission terminal; and setting, out of the pieces of the relay device identification information, a piece of the relay device identification information corresponding to a maximum total priority among the total priorities, as the relay device to be selected.

* * * * *